(12) United States Patent
Wang et al.

(10) Patent No.: US 12,285,680 B2
(45) Date of Patent: Apr. 29, 2025

(54) MULTIPLAYER SOMATOSENSORY SYSTEM, METHOD, AND APPARATUS COMBINING VIRTUAL AND REALITY, AND MEDIUM

(71) Applicant: Tencent Technology (Shenzhen) Company Limited, Guangdong (CN)

(72) Inventors: Gaolei Wang, Shenzhen (CN); Yingyan Zhu, Shenzhen (CN); Hui Xiao, Shenzhen (CN); Xin Liu, Shenzhen (CN); Jin Wang, Shenzhen (CN); Li Luo, Shenzhen (CN); Yu Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 69 days.

(21) Appl. No.: 17/747,680

(22) Filed: May 18, 2022

(65) Prior Publication Data

US 2022/0331694 A1    Oct. 20, 2022

Related U.S. Application Data

(63) Continuation of application No. PCT/CN2021/124201, filed on Oct. 15, 2021.

(30) Foreign Application Priority Data

Apr. 16, 2021  (CN) .......................... 202110412770.7

(51) Int. Cl.
*A63F 13/52* (2014.01)
*A63F 13/57* (2014.01)
(Continued)

(52) U.S. Cl.
CPC .............. *A63F 13/52* (2014.09); *A63F 13/57* (2014.09); *A63F 13/803* (2014.09); *A63F 13/837* (2014.09); *A63F 2300/8082* (2013.01)

(58) Field of Classification Search
CPC ........ A63F 13/52; A63F 13/57; A63F 13/803; A63F 13/837; A63F 2300/8082
See application file for complete search history.

(56) References Cited

U.S. PATENT DOCUMENTS

| | | | |
|---|---|---|---|
| 10,736,159 B2 * | 8/2020 | Kim ...................... | G06F 3/1423 |
| 2010/0267451 A1 * | 10/2010 | Kawano ................ | A63F 13/537 |
| | | | 463/43 |

(Continued)

FOREIGN PATENT DOCUMENTS

| | | |
|---|---|---|
| CN | 103295446 A | 9/2013 |
| CN | 104857704 A | 8/2015 |

(Continued)

OTHER PUBLICATIONS

Machine Translation of JPH06176131A, Picture Synthesis Device and Virtual Reality Device Using the Same, 2017, pp. 1-14 (Year: 2017).*

(Continued)

*Primary Examiner* — Malina D. Blaise
(74) *Attorney, Agent, or Firm* — Crowell & Moring LLP

(57) ABSTRACT

This disclosure discloses a multiplayer somatosensory system, method, and apparatus combining virtual and reality, and a medium, which belongs to the field of human-computer interaction. The system includes: a computer device, and a simulation carrier, n simulation firearms and a display apparatus; where the simulation carrier includes a driver's seat and n passenger seats; the display apparatus is configured to display a virtual environment picture and n aiming points provided by the computer device; and the computer device is configured to control a virtual carrier to change a driving direction in the virtual environment; control the virtual carrier to change a driving speed in the virtual environment; and shoot a virtual object aimed at an $i^{th}$ (Continued)

aiming point in the virtual environment in response to a shooting operation on an $i^{th}$ simulation firearm in the n simulation firearms.

20 Claims, 12 Drawing Sheets

(51) Int. Cl.
    *A63F 13/803* (2014.01)
    *A63F 13/837* (2014.01)

(56) References Cited

U.S. PATENT DOCUMENTS

| | | | |
|---|---|---|---|
| 2013/0005489 A1* | 1/2013 | Santhosh | A63F 13/213 463/43 |
| 2013/0244789 A1* | 9/2013 | Gary | A63F 13/61 463/43 |
| 2013/0310169 A1* | 11/2013 | Satsuma | A63F 13/75 463/30 |
| 2013/0312013 A1* | 11/2013 | Ito | A63F 13/31 719/318 |
| 2014/0068659 A1* | 3/2014 | Vasilikakis | H04N 21/4781 725/60 |
| 2019/0105572 A1* | 4/2019 | Bell | G06F 1/163 |
| 2019/0121522 A1* | 4/2019 | Davis | G06V 40/28 |
| 2020/0086213 A1 | 3/2020 | Perry et al. | |
| 2020/0098172 A1 | 3/2020 | Atsmon | |
| 2021/0012615 A1* | 1/2021 | Coppola | G07F 17/3239 |
| 2021/0192894 A1* | 6/2021 | Higgins | G07F 17/3206 |
| 2022/0197422 A1* | 6/2022 | Freudenberg | G06F 3/0412 |
| 2022/0301041 A1* | 9/2022 | Lee | G06F 9/453 |
| 2023/0226445 A1* | 7/2023 | Buxton, III | G06T 19/006 463/6 |

FOREIGN PATENT DOCUMENTS

| | | | |
|---|---|---|---|
| CN | 107358656 A | | 11/2017 |
| CN | 108172062 A | | 6/2018 |
| CN | 111369861 A | | 7/2020 |
| CN | 111625930 A | | 9/2020 |
| CN | 112973119 A | | 6/2021 |
| EP | 2 883 748 A1 | | 6/2015 |
| JP | 6-176131 | | 6/1994 |
| JP | H06-176131 A | | 6/1994 |
| JP | H 8-36355 | | 2/1996 |
| JP | 2000-116962 A | | 4/2000 |
| JP | 2007-268286 A | | 10/2007 |
| JP | 2013-141527 | | 7/2013 |
| JP | 6176131 B2 | | 7/2017 |
| KR | 10-2018-0008235 A | | 1/2018 |
| WO | WO 2018/002910 A1 | | 1/2018 |

OTHER PUBLICATIONS

International Search Report and Written Opinion for priority application No. PCT/CN2021/124201 dated Jan. 14, 2022, 11p, in Chinese language.
Concise Explanation of Relevance.
Second Office Action for corresponding application No. CN 202110412770.7 dated Jan. 28, 2023, 3p, in Chinese language.
Notification of Reasons for Refusal for corresponding application No. JP 2022-562121 dated Jul. 10, 2023, 4p, in Japanese language.
English language translation for Notification of Reasons for Refusal for corresponding application No. JP 2022-562121 dated Jul. 10, 2023, 5p.
Third examination report for corresponding application No. CN 202110412770.7 dated Jul. 29, 2023, 18p, in Chinese language.
Concise Explanation of Relevancy.
Search Report and First Office Action for corresponding application No. CN 202110412770.7 dated Oct. 18, 2022, 14p, in Chinese language.
Concise Explantion of Relevance.
Korean Office Action with English translation, Jul. 16, 2024, pp. 1-18, issued in Korean Patent Application No. 10-2022-7031619, Intellectual Property Office.
Korean Office Action with English translation, Dec. 16, 2024, pp. 1-19, issued in Korean Application No. 10-2022-7031619, Intellectual Property Office.

* cited by examiner

MULTIPLAYER SOMATOSENSORY SYSTEM, METHOD, AND APPARATUS COMBINING VIRTUAL AND REALITY, AND MEDIUM

RELATED APPLICATION

This application is a continuation of International Application No. PCT/CN2021/124201, filed Oct. 15, 2021, which claims priority to Chinese Patent Application No. 202110412770.7, filed on Apr. 16, 2021 and entitled "MULTIPLAYER SOMATOSENSORY SYSTEM, METHOD, AND APPARATUS COMBINING VIRTUAL AND REALITY, AND MEDIUM." The applications above are incorporated herein by reference in their entireties.

TECHNICAL FIELD

This disclosure relates to the field of human-computer interaction, and in particular, to a multiplayer somatosensory system, method, and apparatus combining virtual and reality, and a medium.

BACKGROUND

In real life, offline somatosensory games are popular in various entertainment venues, such as racing games and shooting games that can be seen everywhere in game halls.

In the related art, game manners between players in the same somatosensory game are similar. For example, in a racing game, both a player A and a player B are racers, and the game manners are to control a simulation vehicle to compete. In a shooting game, a player A and a player B are snipers, and the game manners are to control a simulation firearm to shoot.

In the related art, the human-computer interaction manner under the same somatosensory game is monotonous, and the same somatosensory game system receives few types of player operation instructions, so the somatosensory game has a small degree of freedom.

SUMMARY

This disclosure provides a multiplayer somatosensory system, method, and apparatus combining virtual and reality, and a medium, which can increase human-computer interaction manners. The technical solutions are as follows:

According to an aspect of this disclosure, a multiplayer somatosensory system is provided, including: a computer, and a simulation carrier, n simulation firearms, and a display apparatus respectively connected to the computer, n being a positive integer, the simulation carrier comprising a driver's seat and n passenger seats, a first controller and a second controller being disposed adjacent to the driver's seat, the first controller being configured to control a driving direction, and the second controller being configured to control a driving speed;

the display apparatus being configured to display a virtual environment picture and n aiming points provided by the computer, the virtual environment picture being a picture of a virtual environment in which a virtual carrier corresponding to the simulation carrier is located; and the computer being configured to:

control, in response to a first driving operation on the first controller, the virtual carrier to change the driving direction in the virtual environment;

control, in response to a second driving operation on the second controller, the virtual carrier to change the driving speed in the virtual environment; and shoot a virtual object aimed at an ith aiming point in the virtual environment in the n aiming points in response to a shooting operation on an ith simulation firearm in the n simulation firearms, i being a positive integer not greater than n.

According to an aspect of this disclosure, this disclosure provides a multiplayer somatosensory system, including:

a simulation carrier, comprising:
a driver's seat;
n passenger seats, disposed adjacent to the driver's seat;
a first controller, disposed adjacent to the driver's seat and configured to control a driving direction; and
a second controller, disposed adjacent to the driver's seat and configured to control a driving speed;
n simulation firearms, n being a positive integer;
a display apparatus configured to display a virtual environment picture and n aiming points, the virtual environment picture being a picture of a virtual environment in which a virtual carrier corresponding to the simulation carrier is located; and
a computer, coupled to the simulation carrier, the n simulation firearms, and the display apparatus, and configured to:
provide the n aiming points;
control, in response to a first driving operation on the first controller, the virtual carrier to change the driving direction in the virtual environment;
control, in response to a second driving operation on the second controller, the virtual carrier to change the driving speed in the virtual environment; and
shoot a virtual object aimed at an ith aiming point in the virtual environment in the n aiming points in response to a shooting operation on an ith simulation firearm in the n simulation firearms, i being a positive integer not greater than n.

According to an aspect of this disclosure, a multiplayer somatosensory method combining virtual and reality is provided, performed by a computer device, the method including:

displaying the virtual environment picture and the n aiming points by using the display apparatus, the virtual environment picture being a picture of a virtual environment in which the virtual carrier corresponding to the simulation carrier is located; and controlling, in response to the first driving operation on the first controller, the virtual carrier to change the driving direction in the virtual environment;

controlling, in response to the second driving operation on the second controller, the virtual carrier to change the driving speed in the virtual environment; and shooting the virtual object aimed at the ith aiming point in the virtual environment in the n aiming points in response to the shooting operation on the ith simulation firearm in the n simulation firearms.

According to an aspect of this disclosure, a multiplayer somatosensory apparatus combining virtual and reality is provided, the apparatus including:

a display module, configured to display a virtual environment picture and n aiming points by using the display apparatus, the virtual environment picture being a picture of a virtual environment in which a virtual carrier corresponding to a simulation carrier is located;

a control module, configured to control, in response to a first driving operation on the first peripheral component, the virtual carrier to change a driving direction in the virtual environment;

the control module, further configured to control, in response to a second driving operation on the second peripheral component, the virtual carrier to change a driving speed in the virtual environment; and a shooting module, further configured to shoot a virtual object aimed at an $i^{th}$ aiming point in the virtual environment in the n aiming points in response to a shooting operation on an $i^{th}$ simulation firearm in the n simulation firearms.

According to another aspect of this disclosure, a non-transitory computer-readable storage medium, storing a computer program, the computer program being loaded and executed by a processor to perform steps comprising:

displaying a virtual environment picture and n aiming points by using a display apparatus, the virtual environment picture being a picture of a virtual environment in which a virtual carrier corresponding to a simulation carrier is located;

controlling, in response to a first driving operation on a first controller, the virtual carrier to change a driving direction in the virtual environment;

controlling, in response to a second driving operation on a second controller, the virtual carrier to change a driving speed in the virtual environment; and shooting a virtual object aimed at $i^{th}$ aiming point in the virtual environment in the n aiming points in response to a shooting operation on an $i^{th}$ simulation firearm in n simulation firearms.

According to another aspect of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing multiplayer somatosensory method combining virtual and reality.

The technical solutions provided in the embodiments of this disclosure include at least the following beneficial effects:

A multiplayer somatosensory system combining virtual and reality is constructed, including: a computer, and a simulation carrier, n simulation firearms and a display apparatus. The multiplayer somatosensory system combining virtual and reality improves a degree of freedom of somatosensory games, enriches human-computer interaction manners of players in a same somatosensory game, and realizes that different players can play different roles in the same somatosensory game.

DESCRIPTION OF EMBODIMENTS

To make objectives, technical solutions, and advantages of this disclosure clearer, the following further describes implementations of this disclosure in detail with reference to the accompanying drawings.

First, terms involved in the embodiments of this disclosure are briefly introduced.

Multiplayer somatosensory system combining virtual and reality: a somatosensory system used for mutual cooperation among a plurality of players. In an embodiment, a multiplayer somatosensory system combining virtual and reality includes: a computer device, and a simulation carrier, n simulation firearms, and a display apparatus respectively connected to the computer device, n being a positive integer. In an embodiment, the simulation carrier includes a driver's seat and n passenger seats. In an embodiment, a first peripheral component and a second peripheral component are disposed on the driver's seat, the first peripheral component is configured to control a driving direction, and the second peripheral component is configured to control a driving speed.

Figure 1:
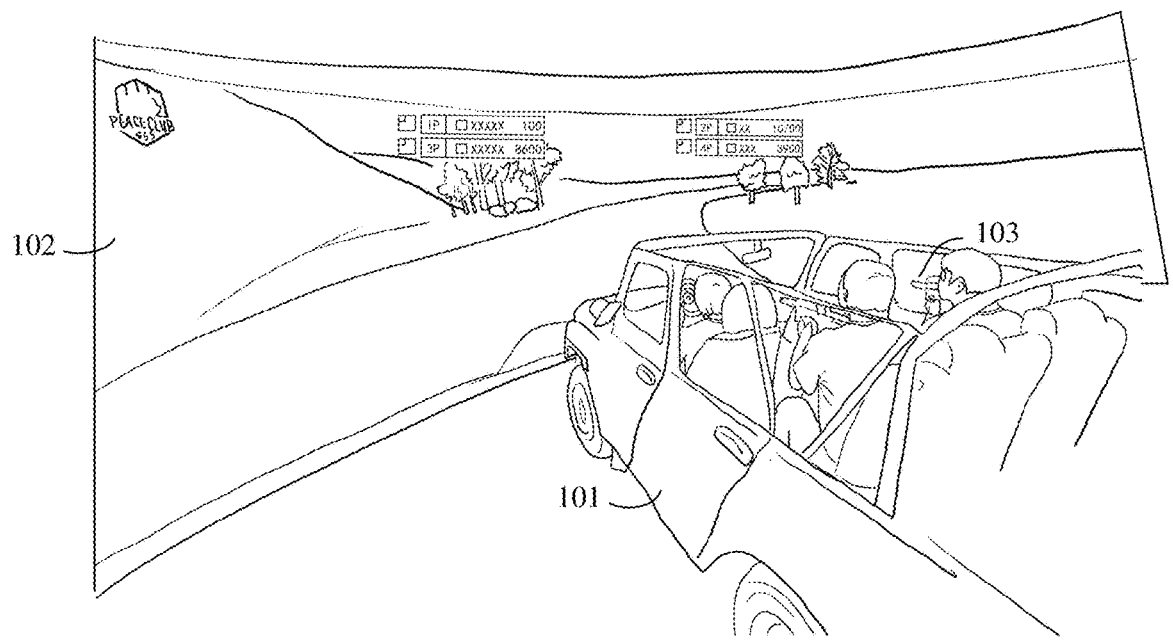
FIG. 1 is a schematic diagram of a multiplayer somatosensory system combining virtual and reality according to an exemplary embodiment of this disclosure.

In an embodiment, FIG. 1 is a schematic diagram of a multiplayer somatosensory system combining virtual and reality according to an exemplary embodiment of this disclosure. The multiplayer somatosensory system combining virtual and reality shown in FIG. 1 includes a simulation carrier 101, a display apparatus 102, and n simulation firearms 103. Exemplarily, the simulation carrier 101 includes but is not limited to: a car, an off-road vehicle, a go-kart, a pickup truck, a motorcycle, a speedboat, or the like. The simulation carrier 101 includes a driver's seat and n passenger seats. In an embodiment, a simulation steering wheel (a first peripheral component) and a simulation pedal (a second peripheral component) are disposed on the driver's seat, where the simulation steering wheel is configured to change a driving direction of a virtual carrier in a virtual environment, and the simulation pedal is configured to change a driving speed of the virtual carrier in the virtual environment.

The display apparatus 102 is configured to display a virtual environment picture and n aiming points, where the n simulation firearms correspond to the n aiming points one-to-one. Schematically, the display apparatus is a surround screen.

The n simulation firearms 103 are configured to shoot virtual objects in the virtual environment. Exemplarily, the simulation firearms include but are not limited to: a pistol, a submachine gun, a shotgun, an assault rifle, a sniper rifle, a crossbow, a machine gun, or the like. Types of the n simulation firearms 103 may be the same or different.

Virtual environment: a virtual environment displayed (or provided) by an disclosure when run on a terminal. The virtual environment may be a simulation environment of a real world, or may be a semi-simulated and semi-fictional environment, or may be an entirely fictional environment. The virtual environment may be any one of a two-dimensional virtual environment, a 2.5-dimensional virtual environment, or a three-dimensional virtual environment. This is not limited in this disclosure. A description is made by using an example in which the virtual environment is a three-dimensional virtual environment in the following embodiments.

Exemplarily, the virtual environment may provide a battle environment for virtual characters. Schematically, in a battle royale game, at least one virtual object plays in a single-round battle in the virtual environment. The virtual object escapes attacks by enemy units and dangers (such as a poison gas area and a swamp) in the virtual environment to survive in the virtual environment. When the hit point of the virtual object in the virtual environment is zero, the life of the virtual object in the virtual environment ends, and a final virtual object successfully surviving wins.

Virtual object: a movable object in the virtual environment. The movable object may be a virtual person, a virtual animal, a cartoon person, or the like, such as a person, an animal, or the like displayed in a three-dimensional virtual environment. Exemplarily, the virtual object is a three-dimensional model created based on a skeletal animation technology. Each virtual object has a respective shape and size in the three-dimensional virtual environment, and occupies some space in the three-dimensional virtual environment.

Figure 2:
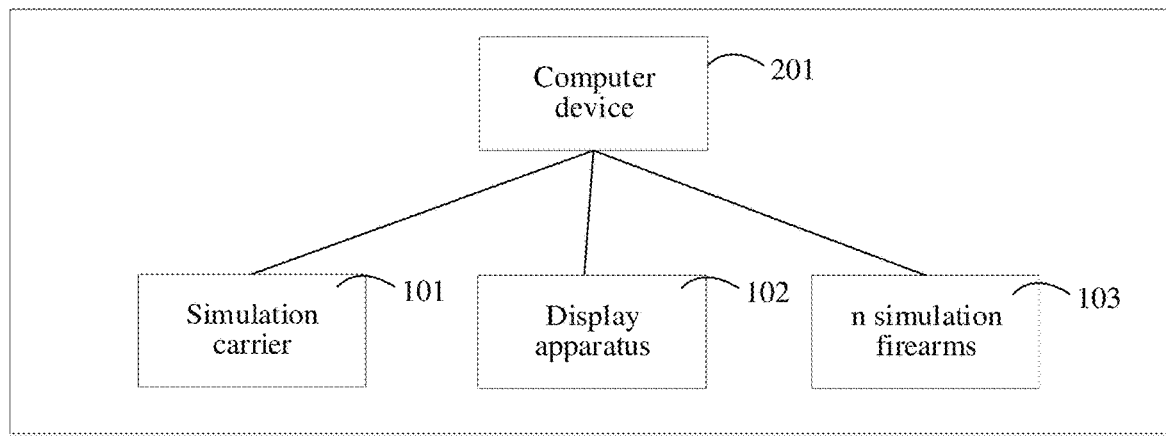
FIG. 2 is a schematic diagram of a multiplayer somatosensory system combining virtual and reality according to an exemplary embodiment of this disclosure.

FIG. 2 is a block diagram of a multiplayer somatosensory system combining virtual and reality according to an exemplary embodiment of this disclosure. A multiplayer somatosensory system 200 combining virtual and reality includes a computer device 201, a simulation carrier 101, n simulation firearms 103, and a display apparatus 102.

In an embodiment, the simulation carrier 101 includes a driver's seat and n passenger seats, a first peripheral component and a second peripheral component being disposed on the driver's seat, the first peripheral component, as a controller, being configured to control a driving direction as a controller, and the second peripheral component, as another controller, being configured to control a driving speed. Exemplarily, the simulation carrier 101 includes a simulation vehicle, the first peripheral component includes a steering wheel, and the second peripheral component includes an accelerator and a brake; or the simulation carrier 101 includes a simulation aircraft, the first peripheral component includes at least one of a flight stick or a rudder, and the second peripheral component includes a throttle stick.

In an embodiment, each simulation firearm in the n simulation firearms 103 includes at least one of a gyroscope, a vibration motor, a battery, a circuit board, or a trigger. In an embodiment, the circuit board transmits the position data to the computer device in response to that the circuit board obtains position data of the simulation firearm by using the gyroscope. A demo board transmits shooting data to the computer device in response to that the circuit board obtains data on whether to shoot of the simulation firearm by using the trigger. The vibration motor is connected to the circuit board, and the circuit board controls, in response to that the circuit board determines shooting, the vibration motor to generate vibration. The battery is connected to the circuit board and the vibration motor to provide power for the circuit board and the vibration motor. In an embodiment, a communication chip is disposed on the circuit board, to enable the circuit board to transmit or receive data.

In an embodiment, the display apparatus 102 displays a virtual environment picture and n aiming points provided by the computer device 201. Exemplarily, the display apparatus includes n+1 virtual reality (VR) headsets, or a semi-surround screen disposed in front of the simulation carrier or a surround screen disposed on a peripheral side of the simulation carrier, or a projector.

In an embodiment, the computer device 201 displays the virtual environment picture and the n aiming points by using the display apparatus 102, the virtual environment picture being a picture of a virtual environment in which a virtual carrier corresponding to the simulation carrier is located. The computer device 201 controls, in response to a first driving operation on the first peripheral component, the virtual carrier to change the driving direction in the virtual environment. The computer device 201 controls, in response to a second driving operation on the second peripheral component, the virtual carrier to change the driving speed in the virtual environment. The computer device 201 shoots a virtual object aimed at an $i^{th}$ aiming point in the virtual environment in the n aiming points in response to a shooting operation on an $i^{th}$ simulation firearm in the n simulation firearms.

Exemplarily, the computer device 201 is implemented as a terminal or a server. An disclosure supporting a virtual environment is installed and run on the computer device 201. The disclosure may be any one of a three-dimensional map program, a military simulation program, a horizontal shooting, a horizontal adventure, a horizontal clearance, a horizontal strategy, a virtual reality disclosure, or an augmented reality program.

In FIG. 2, the computer device 201 is respectively connected to the simulation carrier 101, the n simulation firearms 103, and the display apparatus 102, where connection manners may be implemented as all wired/wireless connections, or partial wired/wireless connections.

Exemplarily, a quantity of the computer device 201 may be more or less. For example, there may be only one computer device 201, or there may be dozens of or hundreds of or more computer devices 201. The quantity and device type of the computer device 201 are not limited in the embodiment of this disclosure.

In order to improve human-computer interaction experience of players, FIG. 1 is a schematic diagram of a multiplayer somatosensory system combining virtual and reality according to an exemplary embodiment of this disclosure. The system includes: the computer device, and the simulation carrier 101, the display apparatus 102, and the n simulation firearms 103 respectively connected to the computer device, n being a positive integer.

Schematically, FIG. 1 shows a multiplayer somatosensory system combining virtual and reality according to an exemplary embodiment of this disclosure. The system includes the simulation carrier 101, the display apparatus 102, and the n simulation firearms 103.

Descriptions for the simulation carrier 101 are as follows:

In an embodiment, the simulation carrier 101 includes a driver's seat and n passenger seats, a first peripheral component and a second peripheral component being disposed on the driver's seat, the first peripheral component being configured to control a driving direction, and the second peripheral component being configured to control a driving speed. Exemplarily, the simulation carrier 101 includes a simulation vehicle, the first peripheral component includes a steering wheel, and the second peripheral component includes an accelerator and a brake; or the simulation carrier 101 includes a simulation aircraft, the first peripheral component includes at least one of a flight stick or a rudder, and the second peripheral component includes a throttle stick. Exemplarily, the simulation carrier 101 includes a simulation ship, the first peripheral component includes a rudder, a paddle, or a sail, and the second peripheral component includes an accelerator and a sail. This disclosure does not limit a type, size, shape, and the like of the simulation carrier 101. In fact, the simulation carrier 101 may be implemented as any type of vehicles.

In an embodiment, the simulation carrier 101 includes but is not limited to: at least one of a simulation car, a simulation off-road vehicle, a simulation go-kart, a simulation pickup truck, a simulation motorcycle, or a simulation speedboat.

Referring to FIG. 1, the simulation carrier 101 is implemented as the simulation off-road vehicle. The simulation carrier 101 in FIG. 1 includes a driver's seat and three passenger seats, which are specifically assigned as a front passenger seat, a left rear seat, and a right rear seat. The first peripheral component is a steering wheel of the simulation off-road vehicle, and the second peripheral component is an accelerator and a brake of the simulation off-road vehicle. The steering wheel of the simulation off-road vehicle is configured to control a driving direction of the simulation off-road vehicle, and the accelerator and brake of the simulation off-road vehicle are configured to control a driving speed of the simulation off-road vehicle.

Figure 3:
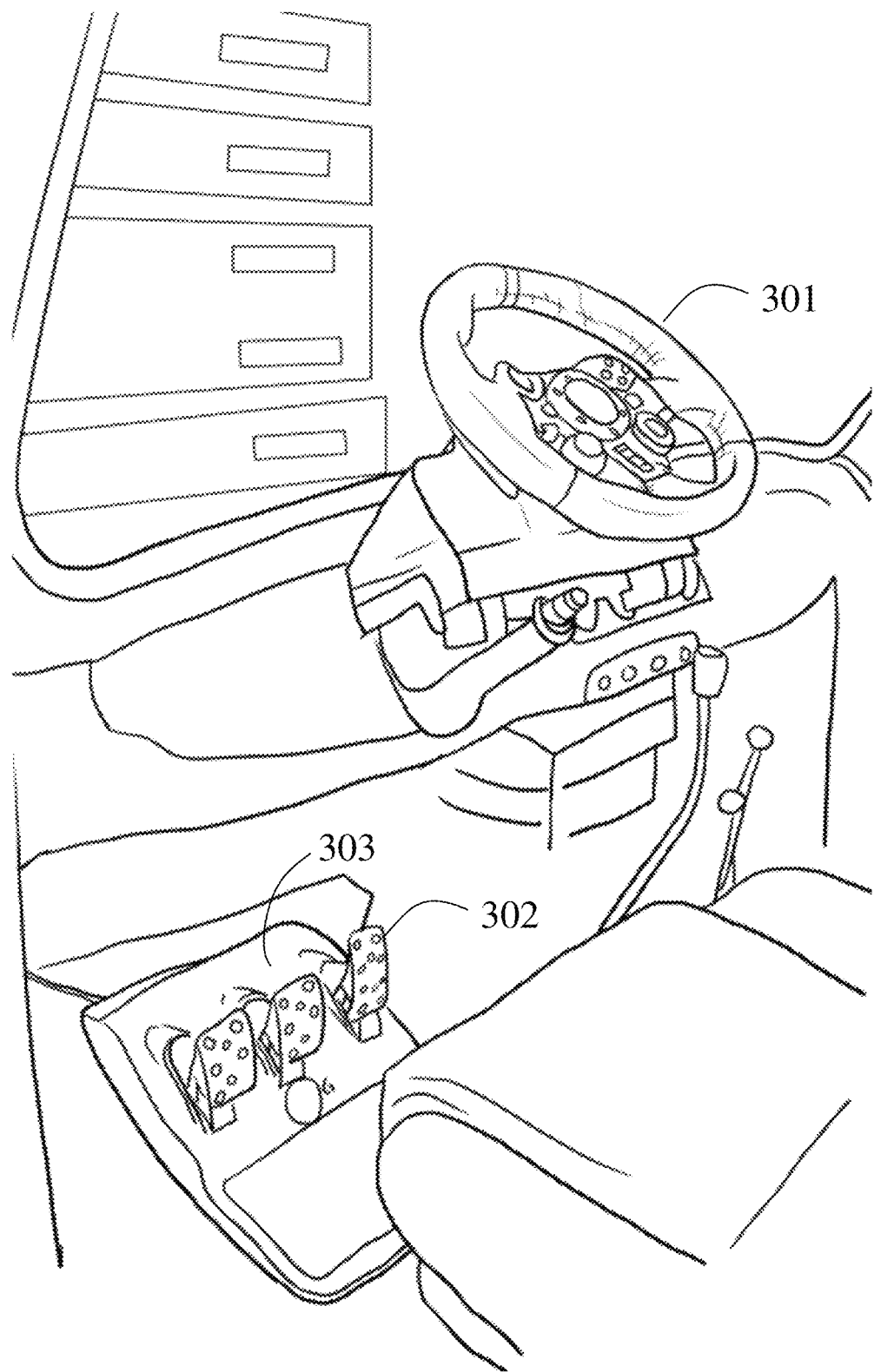
FIG. 3 is a schematic diagram of a first peripheral component and a second peripheral component according to an exemplary embodiment of this disclosure.

Schematically, FIG. 3 shows a first peripheral component and a second peripheral component according to an exemplary embodiment of this disclosure. The first peripheral component is a steering wheel 301, and the second peripheral component includes an accelerator pedal 302 and a brake pedal 303.

In an embodiment, at least one seat of the driver's seat or the n passenger seats in the simulation carrier 101 includes a vibration feedback component. The vibration feedback component is configured to generate vibration on the simulation carrier 101 when a virtual carrier in the virtual environment collides with an obstacle. Schematically, a collision between the virtual carrier and the obstacle includes three possible states: collision occurring, collision existing, and collision leaving. When the collision occurs between the virtual carrier and the obstacle in the virtual environment, the vibration feedback component generates strong vibration on the simulation carrier 101. When the collision exists between the virtual carrier and the obstacle in the virtual environment, the vibration feedback component generates ordinary vibration on the simulation carrier 101. When the collision leaves between the virtual carrier and the obstacle in the virtual environment, the vibration feedback component does not generate vibration on the simulation carrier 101.

The vibration feedback component generates vibration on at least one seat of the driver's seat or the n passenger seats on the simulation carrier 101. Alternatively, the vibration feedback component generates vibration in a trunk of the simulation carrier 101.

In an embodiment, when the virtual carrier collides with a "wall" in the virtual environment, the computer device generates a collision occurrence event between the virtual carrier and the "wall", and controls the vibration feedback component to generate corresponding vibration.

Different obstacles are different due to settings of the virtual environment. That is, there are more than one type of obstacles. Different vibration magnitudes vary due to different collision obstacles, different collision event types, and different driving speeds of the virtual carrier in the virtual environment during the collision.

In an embodiment, when the computer device detects that a surface of the carrier collides with the obstacle, it is the collision occurrence state. When the computer device detects that the surface of the carrier is colliding with the obstacle, it is the collision existence state. When the computer device detects that the surface of the carrier and the obstacle no longer collide, it is the collision leaving state.

Figure 4:
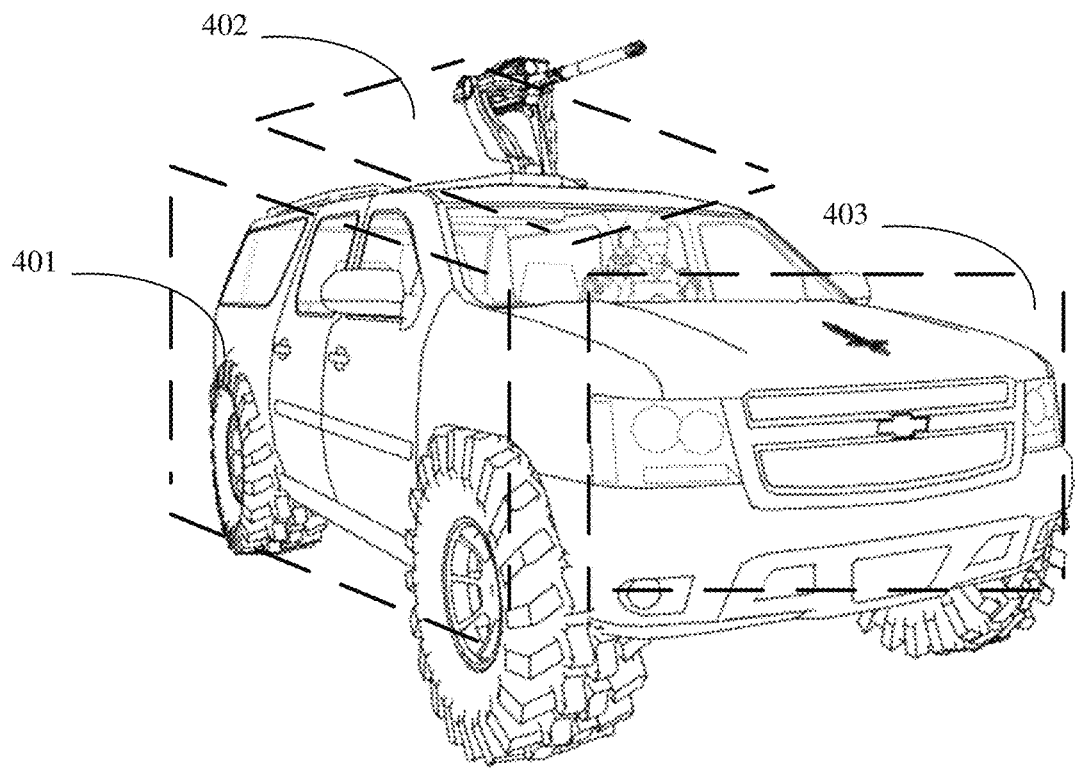
FIG. 4 is a schematic diagram of a virtual carrier according to an exemplary embodiment of this disclosure.

Schematically, FIG. 4 shows three side surfaces of six side surfaces of the carrier. Schematically, the three side surfaces are a front side surface 403 of the carrier, a left side surface 401 of the carrier, and a top side surface 402 of the carrier. When the computer device detects that the left side surface 401 or the top side surface 402, or the front side surface 403 of the carrier collides with the obstacle, it is the collision occurrence state. When the computer device detects that the left side surface 401, the top side surface 402 or the front side surface 403 of the carrier is colliding with the obstacle, it is the collision existence state. When the computer device detects that the left side surface 401, the top side surface 402 or the front side surface 403 of the carrier no longer collides with the obstacle, it is the collision leaving state.

Descriptions for the display apparatus 102 are as follows:

In an embodiment, the display apparatus 102 is configured to display a virtual environment picture and n aiming points provided by the computer device, the virtual environment picture being a picture of a virtual environment in which a virtual carrier corresponding to the simulation carrier is located.

Exemplarily, the display apparatus 102 includes a VR headset or n+1 VR headsets. The n VR headsets correspond to the n aiming points one-to-one. That is, VR headsets corresponding to other passenger seats all display the aiming points except that a VR headset corresponding to the driver's seat of the simulation carrier 101 does not display the aiming point.

Exemplarily, the display apparatus 102 includes a screen, such as a semi-surround screen, disposed in front of the simulation carrier 101 or a surround screen disposed on a peripheral side of the simulation carrier. Exemplarily, the display apparatus 102 includes a projector.

Referring to FIG. 1, FIG. 1 shows that the display apparatus 102 is the surround screen on the peripheral side of the carrier, and the display apparatus 102 shows a picture of the virtual environment where the virtual carrier corresponding to the simulation carrier 101 is located. In FIG. 1, the simulation off-road vehicle is located on a surrounding road at a foot of a mountain, and the virtual environment includes a hillside, a surrounding road, a tree, and the like.

In an embodiment, a width of the semi-surround screen is not less than a width of the simulation carrier 101, and a height of the semi-surround screen is not less than a height of the simulation carrier. The width of the semi-surround screen refers to a width between two vertical sides of the semi-surround screen, and the height of the semi-surround screen refers to a distance between two horizontal sides of the semi-surround screen. Exemplarily, both the semi-surround screen and the simulation carrier 101 are placed on a ground, and the semi-surround screen semi-surrounds the simulation carrier in a semi-surrounding posture. Referring to FIG. 1, a width of the display apparatus 102 (the semi-surround screen) is greater than that of the simulation carrier 101, and a height of the display apparatus 102 (the semi-surround screen) is greater than that of the simulation carrier 101. The display apparatus 102 (the semi-surround screen) semi-surrounds the simulation carrier 101 in the semi-surrounding posture.

Detailed descriptions of the n simulation firearms 103 are as follows:

In an embodiment, the n simulation firearms 103 are configured to shoot virtual objects aimed at n aiming points corresponding to the n passenger seats in the virtual environment.

In an embodiment, when an $i^{th}$ simulation firearm in the n simulation firearms 103 performs a shooting operation, the $i^{th}$ simulation firearm shoots at a virtual object aimed at an $i^{th}$ aiming point corresponding to an $i^{th}$ passenger seat in the virtual environment.

Exemplarily, the n simulation firearms 103 include but are not limited to: at least one of a pistol, a submachine gun, a shotgun, an assault rifle, a sniper rifle, a crossbow, or a machine gun, a bow, an arrow, or any other type of weapons. Types of the n simulation firearms may be the same or different.

In an embodiment, each simulation firearm in the n simulation firearms 103 includes at least one of a gyroscope, a vibration motor, a battery, a circuit board, or a trigger. In an embodiment, the circuit board transmits the position data to the computer device in response to that the circuit board obtains position data of the simulation firearm by using the gyroscope. A demo board transmits shooting data to the computer device in response to that the circuit board obtains data on whether to shoot of the simulation firearm by using the trigger. The vibration motor is connected to the circuit board, and the circuit board controls, in response to that the circuit board determines shooting, the vibration motor to generate vibration. The battery is connected to the circuit board and the vibration motor to provide power for the circuit board and the vibration motor. In an embodiment, a communication chip is disposed on the circuit board, to enable the circuit board to transmit or receive data.

Referring to FIG. 1, the simulation firearm is shown as the assault rifle.

Figure 5:
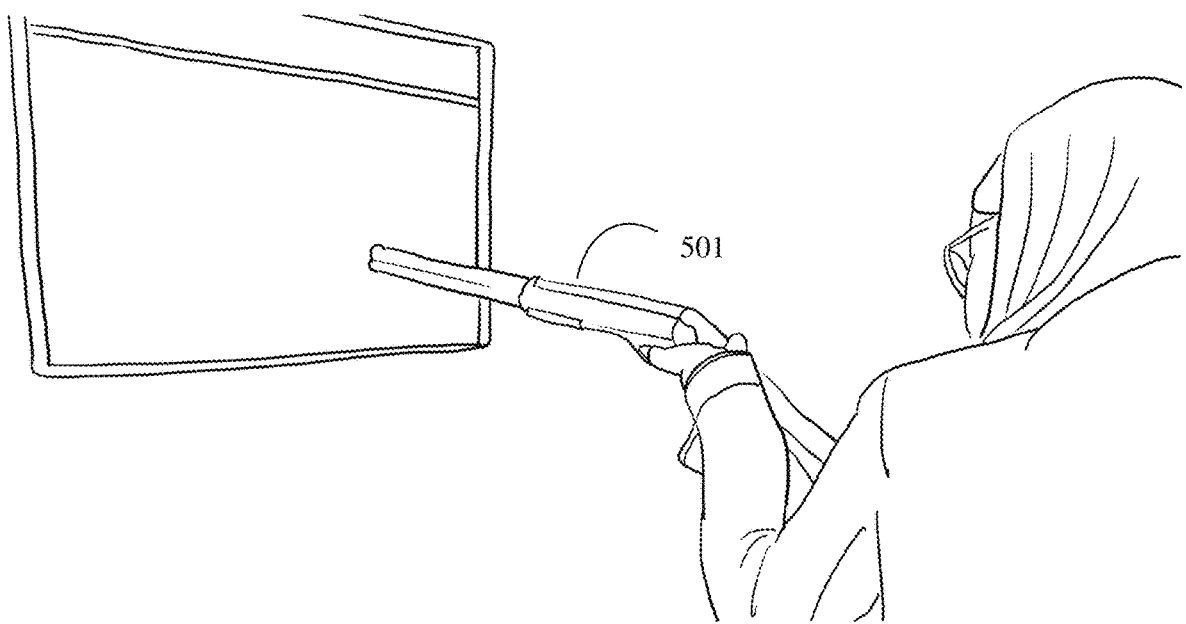
FIG. 5 is a schematic diagram of a simulation firearm according to an exemplary embodiment of this disclosure.

Schematically, FIG. 5 shows a simulation firearm according to an exemplary embodiment of this disclosure. FIG. 5 shows that a player is manipulating the simulation firearm to play a shooting game, and a picture of the shooting game is displayed on a screen. The simulation firearm is wirelessly connected to the screen. In an embodiment, the circuit board performs packet information transmission in a local area network of the simulation firearm and the computer device by using a user datagram protocol (UDP), to realize wireless transmission.

Finally, detailed descriptions for the computer device 201 are as follows:

In an embodiment, the computer device 201 is respectively connected to the simulation carrier 101, the n simulation firearms 103, and the display apparatus 102. The simulation carrier 101 includes a driver's seat and n passenger seats, a first peripheral component and a second peripheral component being disposed the driver's seat, the first peripheral component being configured to control a driving direction, and the second peripheral component being configured to control a driving speed.

The computer device 201 is configured to control, in response to a first driving operation on the first peripheral component, the virtual carrier to change the driving direction in a virtual environment; control, in response to a second driving operation on the second peripheral component, the virtual carrier to change the driving speed in the virtual environment; and shoot a virtual object aimed at an $i^{th}$ aiming point in the virtual environment in the n aiming points in response to a shooting operation on an $i^{th}$ simulation firearm in the n simulation firearms 103.

In an embodiment, the first driving operation refers to an operation of controlling the virtual carrier to change the driving direction in the virtual environment, and the second driving operation refers to an operation of controlling the virtual carrier to change the driving speed in the virtual environment.

Exemplarily, at least one of the n simulation firearms 103 establishes a wireless communication connection with the computer device 201; and/or, at least one of the n simulation firearms 103 establishes a wired communication connection with the computer device 201.

Exemplarily, the simulation carrier 101 is wirelessly connected to the computer device 201, or the simulation carrier 101 is wiredly connected to the computer device 201.

In an embodiment, the n simulation firearms 103 perform data transmission to the computer device 201 by using the UDP protocol.

In an embodiment, the simulation carrier 101 performs data transmission to the computer device 201 by using a human interface device (HID) protocol communication of a universal serial bus (USB).

An operating principle of the multiplayer somatosensory system combining virtual and reality is as follows:

A player in the driver's seat controls the driving direction of the virtual carrier in the virtual environment by using the first peripheral component of the simulation carrier 101, and controls the driving speed of the virtual carrier in the virtual environment by using the second peripheral component of the simulation carrier 101. Players in the passenger seats shoot the virtual object aimed in the virtual environment by using the n simulation firearms 103. Finally the display apparatus 102 displays a picture of the virtual environment where the virtual carrier is located.

In summary, a multiplayer somatosensory system combining virtual and reality is constructed, including: a computer device, and a simulation carrier, n simulation firearms and a display apparatus, thereby enriching human-computer interaction manners of players in a same somatosensory game, and realizing that different players can play a game by using different operating manners in a same somatosensory game.

The foregoing multiplayer somatosensory system combining virtual and reality also includes a vibration feedback component. When the virtual carrier in the virtual environment collides with an obstacle, the vibration feedback component on the simulation carrier vibrates, which realizes simulation of a collision between the virtual carrier and the obstacle, brings a sense of collision in the virtual environment to reality, and realizes an immersive experience of the players in the virtual environment.

The foregoing multiplayer somatosensory system combining virtual and reality improves a degree of freedom of the game, thereby improving a human-computer interaction experience of the players, and meeting increasing entertainment needs of the players.

Figure 6:
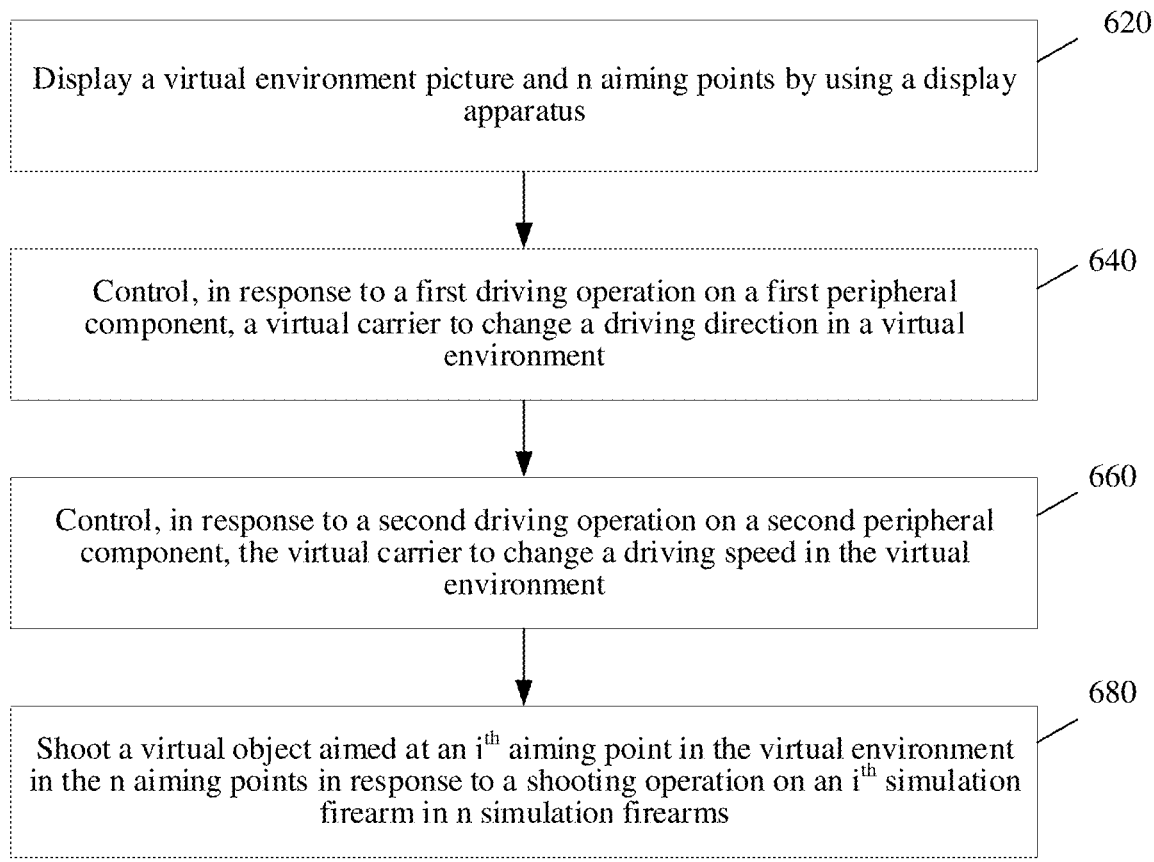
FIG. 6 is a flowchart of a multiplayer somatosensory method combining virtual and reality according to an exemplary embodiment of this disclosure.

FIG. 6 is a flowchart of a multiplayer somatosensory method combining virtual and reality according to an exemplary embodiment of this disclosure. The method is performed by the computer device in the multiplayer somatosensory system combining virtual and reality and includes:

Step 620. Display a virtual environment picture and n aiming points by using the display apparatus.

The virtual environment picture is a picture of a virtual environment in which a virtual carrier corresponding to the simulation carrier is located.

In an embodiment, the display apparatus includes n+1 VR headsets, and the computer device displays the virtual environment picture and the $i^{th}$ aiming point in the n aiming points by using an $(i+1)^{th}$ VR headset in the n+1 VR headsets.

In an embodiment, the display apparatus includes a surround screen or a projector. The computer device displays the virtual environment picture and the n aiming points by using the surround screen or the projector, the n aiming points having different icon styles, the icon styles including at least one of shape, color, transparency or number.

The virtual environment picture and the n aiming points are located on an interface of a same display apparatus.

Figure 7:
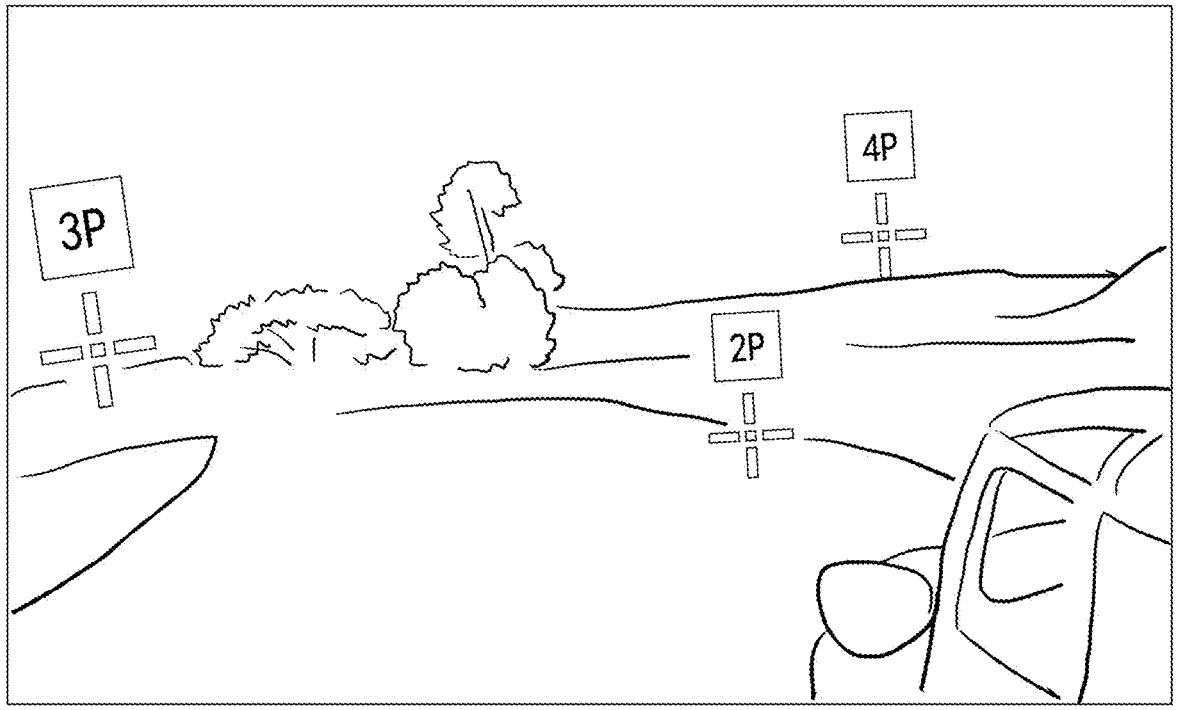
FIG. 7 is a schematic diagram of an aiming point according to an exemplary embodiment of this disclosure.

Schematically, FIG. 7 is a schematic diagram of an icon style of an aiming point according to an exemplary embodiment of this disclosure. The icon style of the aiming point is displayed as a cross-shaped crosshair, and a label of a corresponding passenger seat is displayed on each crosshair.

In an embodiment, in response to that the computer device receives aiming data transmitted by the simulation firearm, the computer device displays the virtual environment picture and the n aiming points by using the display apparatus.

In an embodiment, the aiming data may include an Euler angle of rotation of a gyroscope in the simulation firearm, magnification factor of the aiming point, reduction factor of the aiming point, and the like. The gyroscope is disposed on the simulation firearm. The gyroscope is configured to monitor an offset degree when the player controls the simulation firearm, and generate an Euler angle based on the offset degree of the simulation firearm, the Euler angle being used for describing a position of a sight scope on the simulation firearm. In an embodiment, the aiming data is a quaternion corresponding to the Euler angle of the gyroscope on the firearm.

In an embodiment, the n simulation firearms include exclusive numbers. For example, a number of the simulation firearm 1 is aim01, and a number of the simulation firearm 2 is aim02.

In an embodiment, in response to that the computer device receives the aiming data transmitted by the simulation firearm, the computer device displays the n aiming points by using the display apparatus, which is implemented by the following codes:

```
//obtain data transmitted by a specified ip by using a udp module of
  nodejs
  const dgram = require('dgram');
  const dgramServer = dgram.createSocket('udp4');
  dgramServer.on('message', (message, rinfo) => {;
    const IP = rinfo.address;
    const msg = message;
```

```
    //if an ip in a UDP port is aim01IP, report a parameter reported by a
udp
to a computer device
    if (IP===aim01Ip) {
      const data = [msg.readFloatLE(3), msg.readFloatLE(7),
msg.readFloatLE(11), msg.readFloatLE(15), message[2]];
      socketData.aim01 = data;
    };
    ...
  };
  // listen to a socket aimiMove event
  Vars.socket.on('aimiMove', (data)=> {
      this.aimMgr (data);
    });
    ...
    // simulation firearm1
    if(data.aim01.length > 0){
      //offset value
      const posX = 100;
      //quaternion data of a gyroscope
      let quat = new Quat(data.aim01[0],-data.aim01[2],-
data.aim01[3],data.aim01[1]);
      const offset = new Vec3(0, 0, 1);
  //convert to a 3D vector
  Vec3.transformQuat(offset, offset, quat);
  //3D vector multiplies 1200
  offset.multiplyScalar(1200);
  const aimPos = new Vec3(offset.x,offset.y,0);
  //coordinate boundary detection
  const pos = aimBoundary(aimPos);
  //assign a crosshair (2D)
  this.aim01.setPosition(pos.x+posX,pos.y,0);
```

Step 640. Control, in response to a first driving operation on the first peripheral component, the virtual carrier to change a driving direction in the virtual environment.

The first driving operation refers to a driving operation performed on the simulation carrier to control the driving direction of the simulation carrier.

In an embodiment, the simulation carrier includes a simulation vehicle. The computer device controls, in response to a first driving operation on a steering wheel of the simulation vehicle, the virtual vehicle to change the driving direction in the virtual environment.

In an embodiment, the simulation carrier includes a simulation aircraft. The computer device controls, in response to a first driving operation on a flight stick and/or a rudder of the simulation aircraft, a virtual aircraft to change the driving direction in the virtual environment.

In an embodiment, the computer device receives steering data of a steering wheel on a simulation vehicle, which is implemented by the following codes. The steering data includes a quaternion of the Euler angle of rotation of the steering wheel.

```
    const g = require('logitech-g29');
    //an initial value of a steering wheel
    const wheelOptions = {
      autocenter: [0.2, 0.2],
      debug: false,
      range: 900,
    };
    // connect the steering wheel
    g.connect(wheelOptions, (err) => {
      if (err) return;
      let baseWheel = 50;
      g.connect(wheelOptions, (err) => {
        if (err) return;
      g.connect({ autocenter: true })
```

```
// listen to a steering operation event of a player, and if it occurs,
transmit steering data of a current steering wheel to the computer device
    g.on('wheel-turn', function(val) {
        io.emit('wheel-turn', [val, baseWheel - val]);
    })
```

Step 660. Control, in response to a second driving operation on the second peripheral component, the virtual carrier to change the driving speed in the virtual environment.

The second driving operation refers to a driving operation performed on the simulation carrier to control the driving speed of the simulation carrier.

In an embodiment, the simulation carrier includes a simulation vehicle. The computer device controls, in response to a second driving operation on an accelerator and/or a brake of the simulation vehicle, the virtual vehicle to change the driving speed in the virtual environment.

In an embodiment, the simulation carrier includes a simulation aircraft. The computer device controls, in response to a second driving operation on a throttle stick of the simulation aircraft, a virtual aircraft to change a driving speed in the virtual environment.

In an embodiment, the computer device receives forward data of the accelerator and the brake on the simulation vehicle, which is implemented by the following codes. The forward data includes acceleration data corresponding to acceleration generated by the accelerator and deceleration data corresponding to the deceleration generated by the brake.

```
//listen to a braking operation event of the player, and transmit
deceleration data of the brake to the computer device if it occurs
    g.on('shifter-gear', function(val) {
        io.emit('shifter-gear', val);
    });
    //listen to an accelerating operation event of the player, and transmit
acceleration data of the accelerator to the computer device if it occurs
    g.on('pedals-gas', function(val) {
        io.emit('pedals-gas', val);
    })
    ...
})
```

In an embodiment, the computer device calculates the coordinates of the virtual vehicle in the virtual environment from the forward data and the steering data generated in step 640, which is specifically implemented by the following codes:

```
// stop moving forward if it collides with a wall
if(this.carFrontOnWall) return;
    speed = this.forwardData-this.brakeData;//calculate difference between
acceleration data and deceleration data, to obtain forward data
    speedBase = speed*this.maxSpeedBase/this.fullSpeed/2;//convert the forward
data to a forward distance traveled by the virtual vehicle in the virtual environment
        if(speed< 0) {
            speed = 0;
        }
    // if it is not a wall or an obstacle, move the virtual vehicle in the virtual
environment according to the forward distance
    this.carPosition.x = this.carPosition.x +
Number(((Math.sin(2*Math.PI/360*(90+this.carEulerAngles.y))*speedBase).toFixed(3)));
    this.carPosition.z = this.carPosition.z -
Number(((Math.sin(2*Math.PI/360*(this.carEulerAngles.y))*speedBase).toFixed(3)));
    this.node.setWorldPosition(this.carPosition.x,this.carPosition.y,this.carPosition.z);
```

There is a mapping relationship between the forward distance of the virtual vehicle in the virtual environment and the forward data generated by the simulation vehicle. Exemplarily, the forward distance is speed, the forward distance of the virtual vehicle in the virtual environment is speedBase, a maximum forward distance of the virtual vehicle in the virtual environment is maxSpeedBase, a maximum forward data generated by the simulation vehicle is fullSpeed, and the mapping relationship is speedBase=speed* maxSpeedBase/fullSpeed/2.

The steering data refers to a steering angle generated by the steering wheel of the simulation vehicle. Exemplarily, the steering angle is a Euler angle. Exemplarily, a formula for mapping the forward distance to the coordinates of the virtual vehicle in the virtual environment is:

$$carPosition.x = carPosition.x + \sin(2*PI/360*(90+carEulerAngles.y))*speedBase) \quad (1)$$

In the foregoing formula (1), carPosition.x on a left side of the formula is an x coordinate of the virtual vehicle after steering, carPosition.x on a right side of the formula is an x coordinate of the virtual vehicle before steering, and carEulerAngles·y is an Euler angle generated by steering wheel rotation.

$$carPosition.z = carPosition.z - \sin(2*PI/360*carEulerAngles.y)*speedBase \quad (2)$$

In the foregoing formula (2), carPosition.z on a left side of the formula is a z coordinate of the virtual vehicle after steering, and carPosition.z on a right side of the formula is a z coordinate of the virtual vehicle before steering.

In an embodiment, in response to that the virtual vehicle in the virtual environment collides with the virtual object, the computer device controls the vibration feedback component on the simulation carrier to generate vibration,

```
which is specifically implemented by the following codes:
//attach a collision event to a collider
carFrontCollider.on('onTriggerStay', this.onTrigger, this);
carFrontCollider.on('onTriggerEnter', this.onTrigger, this);
carFrontCollider.on('onTriggerExit', this.onTrigger, this);
//obtain a value when the collision event occurs
onTrigger(event){
    const eNode = event.otherCollider.node;
    const eName = eNode.__name;
    const scoreTips = this.aim00Scoretips;
    //if a current collider is not a wall or an obstacle, execute forward or
backward logic. otherwise, prompt that it cannot move
    if(event.type === 'onTriggerEnter' || event.type ===
```

-continued

```
'onTriggerStay'){
    if(eName.indexOf('Wall') === 0 || eName.indexOf('jeep') === 0 ||
eName.indexOf(Outside_Target_07') === 0){
        if(event.selfCollider.node._name.indexOf('Front')===0){
            this.carFrontOnWall = true;
        }
        if(event.selfCollider.node._name.indexOf('Rear')===0){
            this.carRearOnWall = true;
        }
...
```

Hardware setting of the vibration feedback component is implemented by the following codes:

```
const SerialPort = require('serialport');
const getCRC = require('./libs/crc16');
// connect a vibration module plugged into a com5 port
SHOCK = new SerialPort('COM5', { autoOpen: true, baudRate:
38400 });
// listen to an event corresponding to the com5 port
SHOCK.on('close', (line) => console.log('> Close, an error occurred
in a vibrator',line));
SHOCK.on('error', (err) => console.log('> Error, an error occurred in a
vibrator', err.message));
//write 1500 (0x5dc) RPM for No. 1 motor
let buffer = Buffer.from([1, 0x3, rpm === 0 ? 0 : 0x1, 0, 0, 4, 0, 0]);
buffer.writeUInt16LE(0x5dc, 3);
let crc = getCRC(buffer, buffer.length - 2);
buffer.writeUInt16BE(crc, 6);
SHOCK. write(buffer);
```

Step 680. Shoot a virtual object aimed at an $i^{th}$ aiming point in the virtual environment in the n aiming points in response to a shooting operation on an $i^{th}$ simulation firearm in the n simulation firearms.

In an embodiment, the computer device shoots a virtual object aimed at an $i^{th}$ aiming point in the virtual environment in the n aiming points in response to a shooting operation on an $i^{th}$ simulation firearm in the n simulation firearms.

In an embodiment, the shooting operation includes, but is not limited to: starting shooting, stopping shooting, adjusting shooting distance, replacing simulation magazines, and the like. In an embodiment, shooting data generated by the shooting operation is a shooting instruction aim01 [4] of the simulation firearm 1.

A virtual object aimed at an $i^{th}$ aiming point in the virtual environment in the n aiming points is shot in response to a shooting operation on an $i^{th}$ simulation firearm in the n simulation firearms. Exemplarily, n=4, i=1, and it is implemented by the following codes:

```
//when aim01[4]=1, trigger shooting logic
if(data.aim01[4] === 1){
    this.fire('aim01');
}
```

In an embodiment, the computer device shoots a virtual object aimed at a first aiming point in the virtual environment, which is implemented by the following codes:

```
// temporary 3D vector
const screenP_mouse = new Vec3( );
// 2D coordinates to 3D coordinates
this.canvas_2d.camera.worldToScreen(screenP_mouse, aimNode.worldPosition);
// generate a ray
this.mainCamera.screenPointToRay(screenP_mouse.x,screenP_mouse.y,
this._ray_mouse);
// obtain nodes included in the ray
const raycaseList = PhysicsSystem.instance.raycast(this._ray_mouse);
// process the nodes
if(raycaseList){
    const all = PhysicsSystem.instance.raycastResults;
    all.forEach((r,index)=>{
// obtain a location based on a property of r.distance
        if(r.distance > 250) return;
// determine separate logic based on node name
        if(r._collider.node.name === 'target' ... ) {
            //...
        }
    })
}
```

In summary, the computer device converts two-dimensional coordinates of the aiming point into three-dimensional coordinates of the aiming point in the virtual environment. When receiving a start shooting instruction, the computer device emits a ray along a direction of a camera in the virtual environment and the aiming point in the virtual environment. When the ray collides with the virtual object in the virtual environment, the computer device obtains the virtual object, and displays performance characteristics of the virtual object when the virtual object is obtained on the display apparatus. Exemplarily, the performance characteristics of the virtual object include that a bullet hole appears on the virtual object, the virtual object explodes, the virtual object disappears, and the like.

In summary, by using the multiplayer somatosensory method combining virtual and reality performed by the computer device, the computer device controls the display apparatus to display the virtual environment picture and the aiming points, controls the virtual carrier to change the driving direction and driving speed in the virtual environment, and implements shooting the virtual object aimed at the $i^{th}$ aiming point in the virtual environment in the n aiming points, which enriches the human-computer interaction manner of the players in the same somatosensory game, and realizes that different players can play the game by using different operation manners under the same somatosensory game.

The foregoing multiplayer somatosensory method combining virtual and display improves a degree of freedom of the game, thereby improving a human-computer interaction experience of the players, and meeting increasing entertainment needs of the players.

Figure 8:
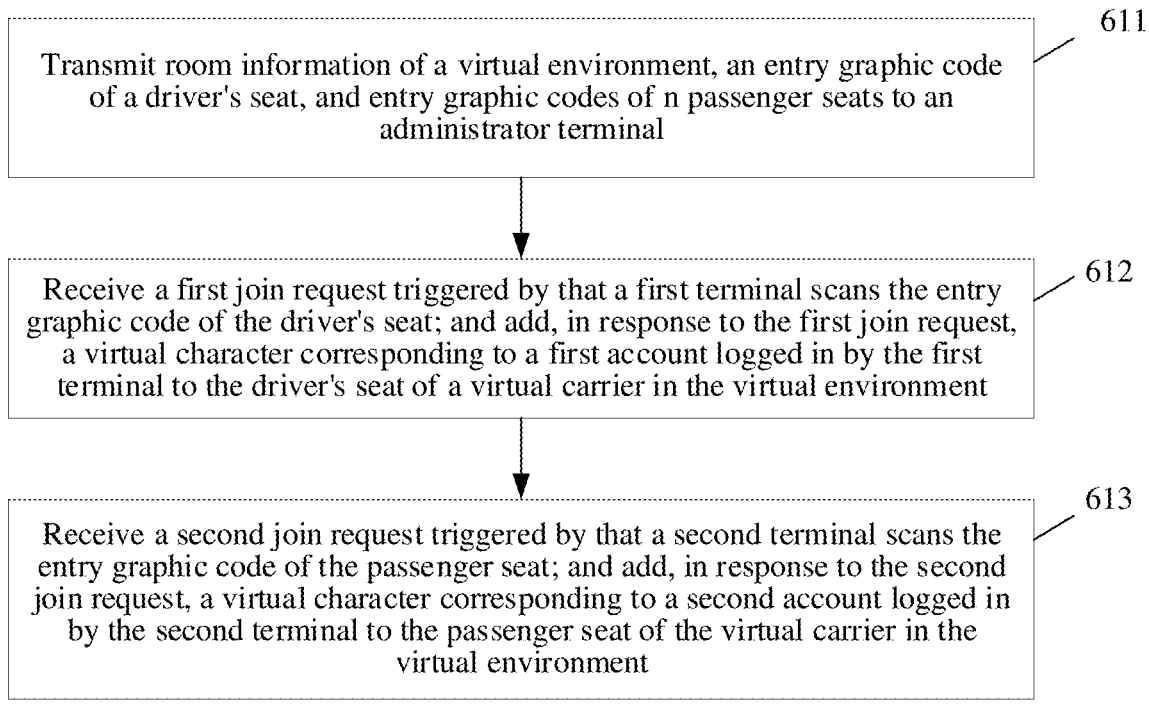
FIG. 8 is a flowchart of a multiplayer somatosensory method combining virtual and reality according to another exemplary embodiment of this disclosure.

In order to achieve management and deployment of the driver's seat and the passenger seats, based on the exemplary embodiment shown in FIG. 6, FIG. 8 shows a multiplayer somatosensory method combining virtual and reality provided by an exemplary embodiment of this disclosure. The following steps are further included before step 620:

Step 611: Transmit room information of the virtual environment, an entry graphic code of the driver's seat, and entry graphic codes of the n passenger seats to an administrator terminal.

In an embodiment, the multiplayer somatosensory system combining virtual and reality further includes an administrator terminal. The administrator terminal is configured to receive data transmitted by the computer device or transmit data to the computer device. Exemplarily, the administrator terminal receives the room information transmitted by the computer device, and displays a state of at least one room on a terminal interface. Exemplarily, the administrator terminal transmits information of a virtual character selected by the player to the computer device, and displays the information of the virtual character selected by the player on the terminal interface.

In an embodiment, the computer device transmits the room information of the virtual environment, an entry graphic code of the driver's seat, and entry graphic codes of the n passenger seats to the administrator terminal.

Figure 9:
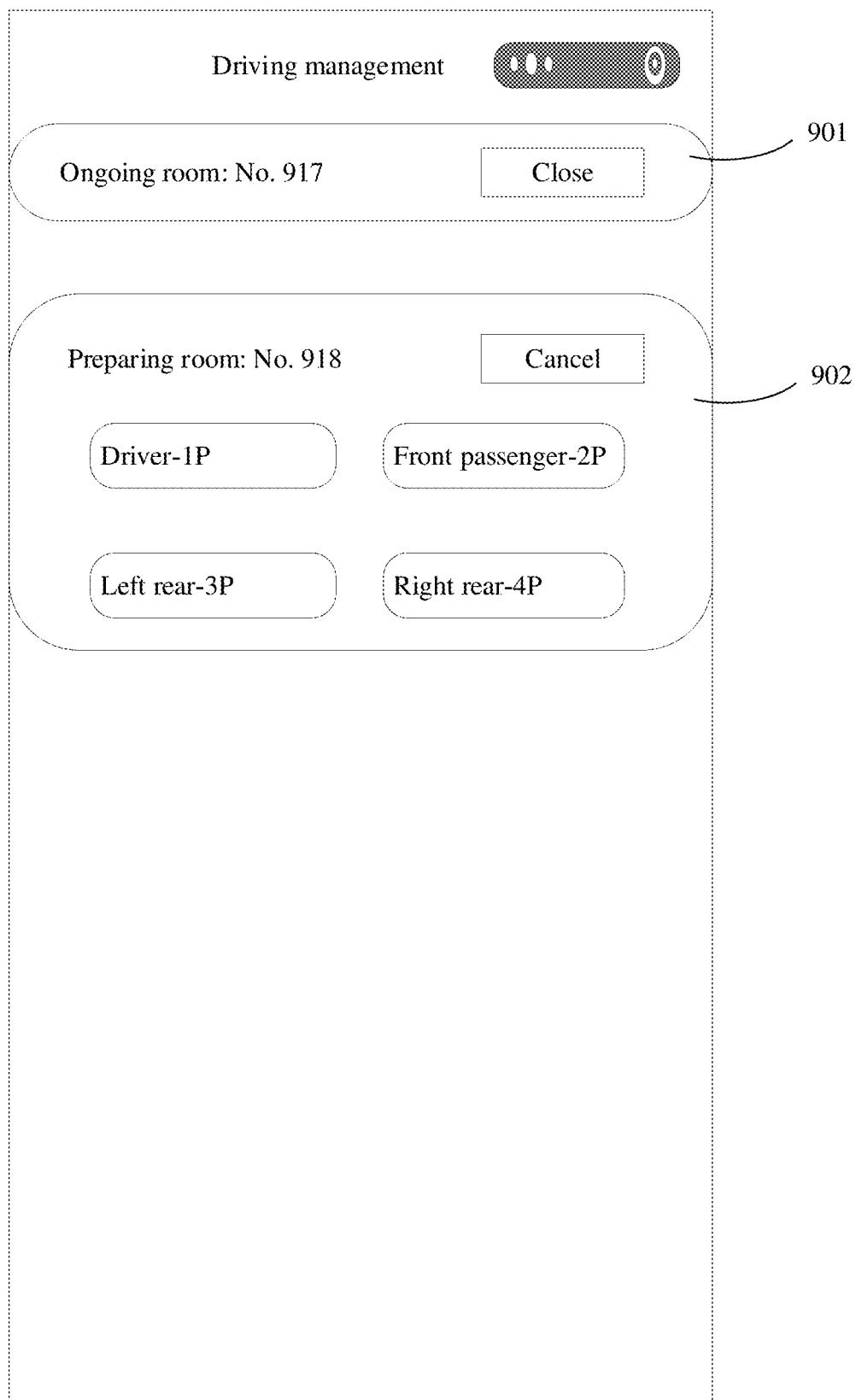
FIG. 9 is a schematic diagram of an administrator interface according to an exemplary embodiment of this disclosure.

In an embodiment, in response to that the computer device transmits the room information of the virtual environment to the administrator terminal, the administrator terminal displays the administrator interface. Schematically, FIG. 9 is a schematic diagram of an administrator interface according to an exemplary embodiment of this disclosure. The administrator interface displays a reduced window 901 of an ongoing room and a detailed window 902 of a preparing room, where n=3, which means FIG. 9 shows 3 passenger seats.

The reduced window 901 of the ongoing room displays "Ongoing room: No. 917" and "Close" controls. In an embodiment, in response to that the administrator touches the "close" control, the administrator terminal transmits an instruction of closing Room 917 to the computer device, and the computer device performs an operation of closing the Room 917.

A detailed window 902 of the preparing room displays "Preparing room: No. 918", four selectable seat controls of Room 918, which are "Driver-1P, Front passenger-2P, Left rear-3P and Right rear-4P", and a "Cancel" control. In response to that the administrator touches the "Driver-1P" control, the computer device transmits a driver's seat graphic code to the administrator terminal. In response to that the administrator touches any one of the "Front passenger-2P, Left rear-3P, and Right rear-4P" controls, the computer device transmits a passenger seat graphic code to the administrator terminal. In response to that the administrator touches the "Cancel" control, the administrator terminal transmits an instruction to cancel the Room 918 to the computer device, and the computer device performs an operation of canceling the Room 918.

Figure 10:
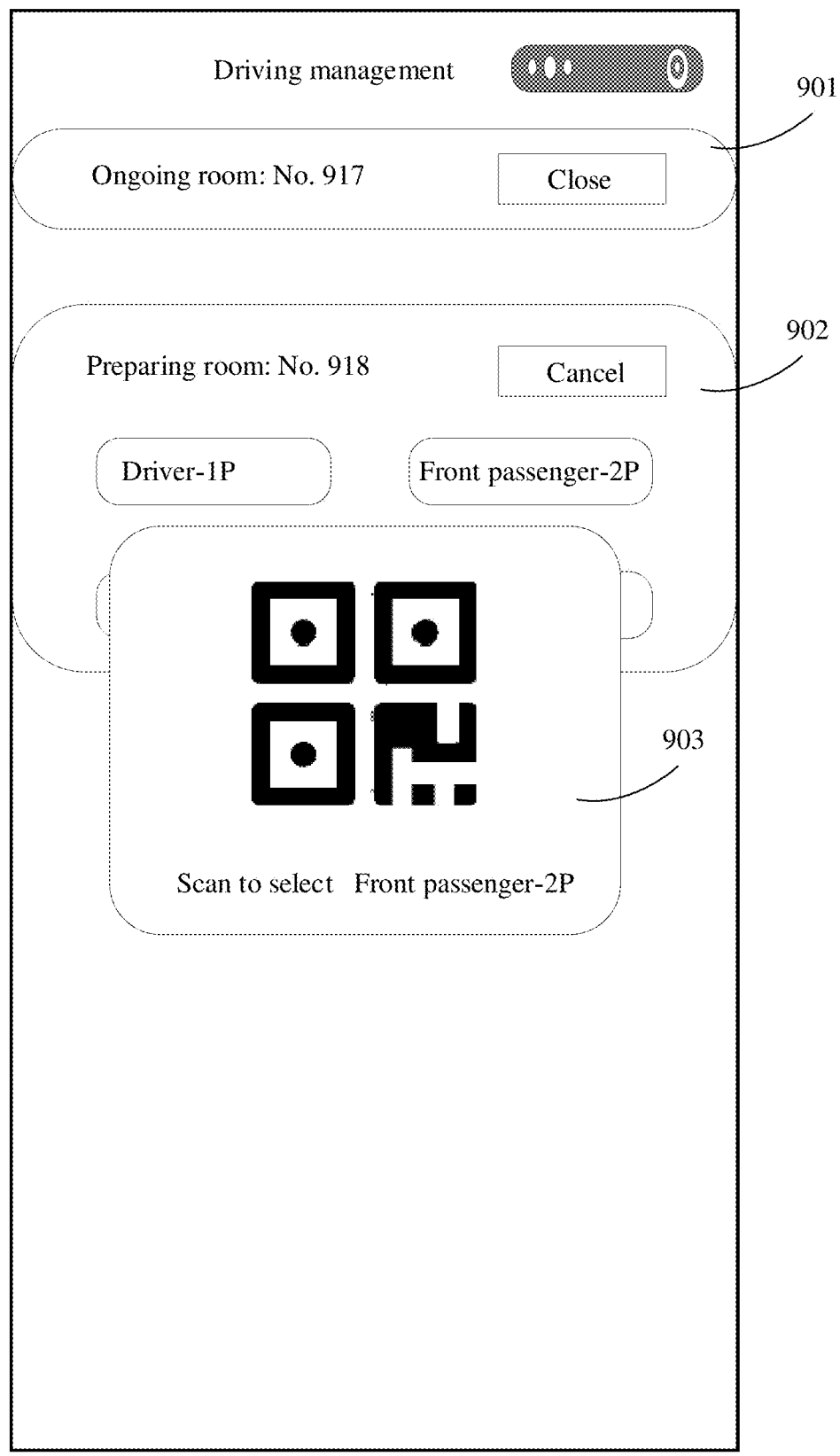
FIG. 10 is a schematic diagram of an administrator interface according to another exemplary embodiment of this disclosure.

In an embodiment, in response to that the computer device transmits the driver's seat entry graphic code and the n passenger seat entry graphic codes to the administrator terminal, the administrator terminal displays the administrator interface. Schematically, FIG. 10 shows a schematic diagram of an interface in which the administrator terminal displays an entry graphic code of the front passenger-2P according to an exemplary embodiment of this disclosure. As shown in FIG. 10, on a basis of FIG. 9, a passenger seat entry graphic code 903 of the "front passenger-2P" is added in FIG. 10. Interface diagrams of administrator terminals on which graphic codes corresponding to the driver-1P, the left rear-3P, and the right rear-4P are displayed on the administrator interface are similar to that of FIG. 9, and details will not be repeated herein again.

Step 612. Receive a first join request triggered by that a first terminal scans the entry graphic code of the driver's seat; and add a virtual character corresponding to a first account logged in by the first terminal to the driver's seat of the virtual carrier in the virtual environment in response to the first join request.

The first join request refers to a request from the player for joining the driver's seat when the player has logged into an account on the first terminal. That is, the player requests for driving the simulation carrier. The first account logged in by the first terminal refers to an account of the first player logged in on the terminal, which is used for recognizing a first player and for transmitting/receiving information of the first player.

In an embodiment, the computer device receives the first join request triggered by that the first terminal scans the driver's seat entry graphic code, and in response to the first join request, the computer device adds a virtual character corresponding to the first account logged in by the first terminal to the driver's seat of the virtual carrier in the virtual environment.

Step 613. Receive a second join request triggered by that a second terminal scans the entry graphic code of the passenger seat; and in response to the second join request, add a virtual character corresponding to a second account logged in by the second terminal to the passenger seat of the virtual carrier in the virtual environment.

The second join request refers to a request from the player for joining the passenger seat when the player has logged into an account on the second terminal. That is, the player requests for being a passenger of the simulation vehicle and controlling the simulation firearm.

The second account logged in by the second terminal refers to an account of the second player logged in on the terminal, which is used for recognizing a second player and transmitting/receiving information of the second player.

In an embodiment, the computer device receives a second join request triggered by that a second terminal scans the entry graphic code of the passenger seat; and in response to the second join request, the computer device adds a virtual character corresponding to a second account logged in by the second terminal to the passenger seat of the virtual carrier in the virtual environment.

Figure 11:
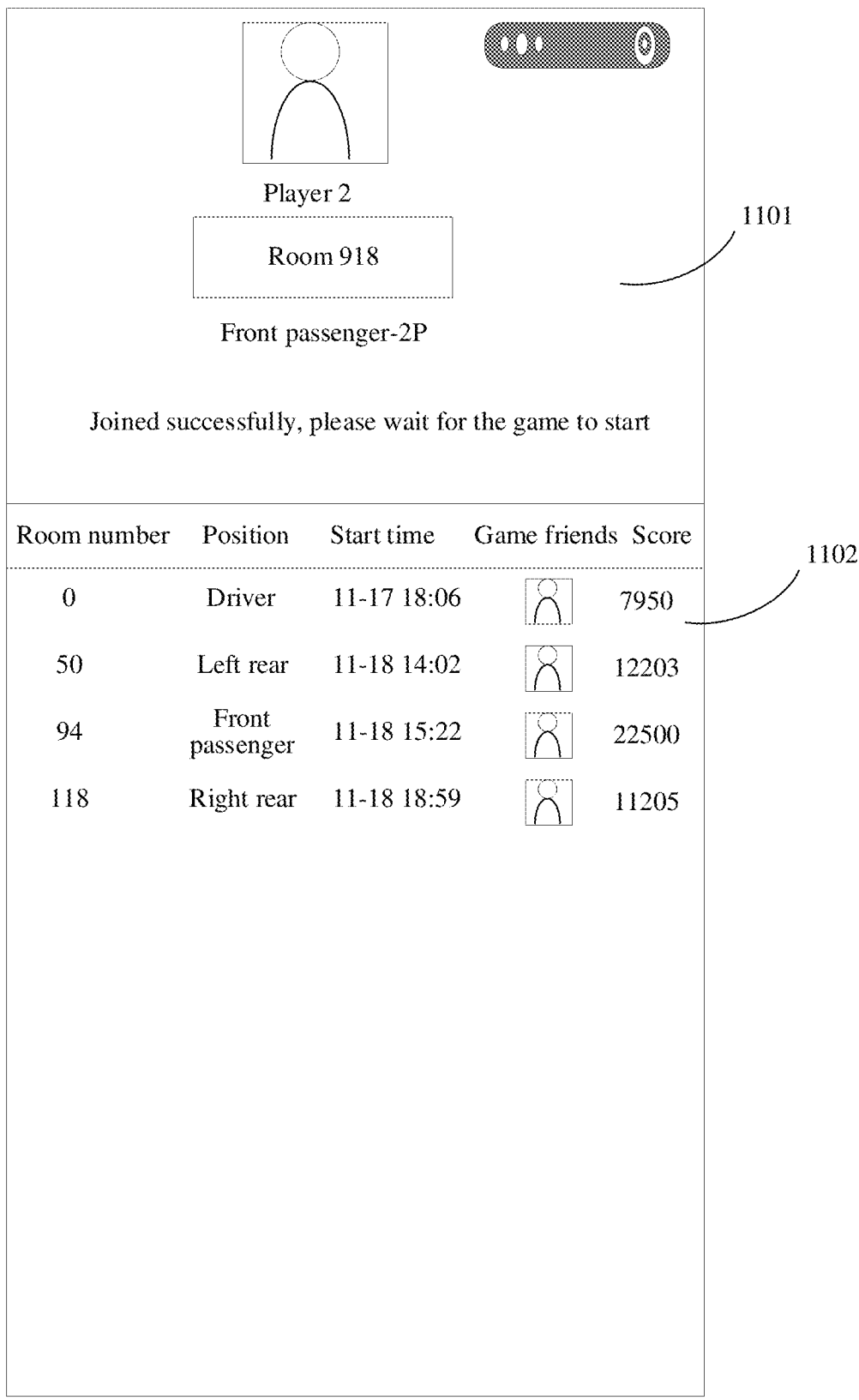
FIG. 11 is a schematic diagram of an administrator interface according to another exemplary embodiment of this disclosure.

Schematically, FIG. 11 shows an administrator interface displayed on the administrator terminal after the computer device adds the virtual character corresponding to the second account logged in by the second terminal to the passenger seat of the virtual carrier in the virtual environment.

Second account information added to the front passenger-2P of the virtual carrier in the virtual environment, including an avatar, a name, a room number of the second account, and the passenger seat of the virtual carrier are displayed in account information region 1101. Information of a room that has been started, including "room number" information, "position" information, "start time" information, avatar information of "game friends", and "score" information are displayed in room information region 1002.

In an embodiment, the player needs to choose to join a room after scanning the graphic code in the foregoing steps.

Figure 12:
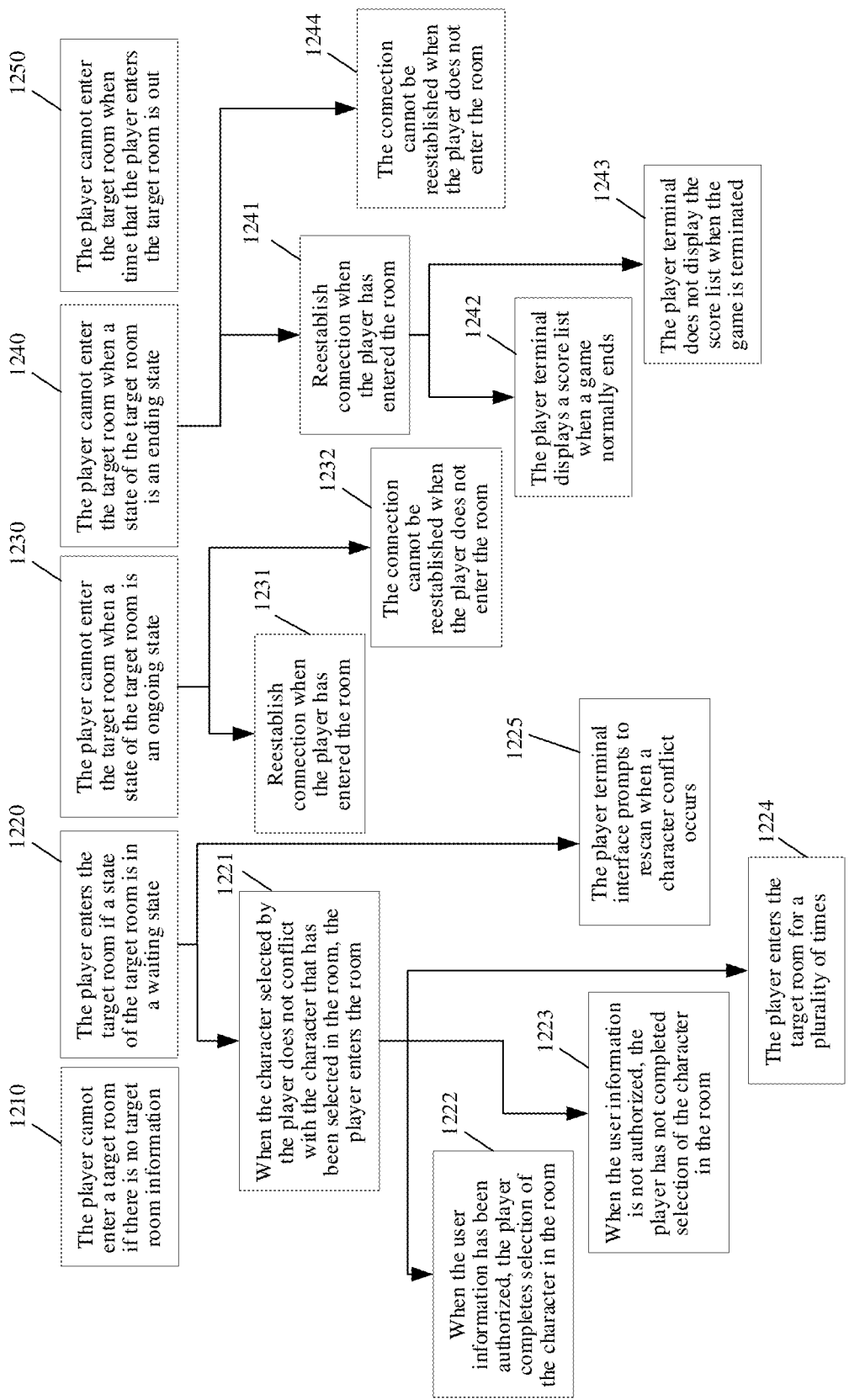
FIG. 12 is a flowchart of a player joining a room according to an exemplary embodiment of this disclosure.

Schematically, FIG. 12 is a flowchart of a player joining a room according to an exemplary embodiment of this disclosure. The joining the room includes the following cases:

First Case:

Step 1210. The player cannot enter a target room if there is no target room information.

When the player touches a target room control, a player terminal interface displays information that there is no room. That is, the room is not opened and the player cannot enter the room.

Second Case:

Step 1220. The player enters the target room if a state of the target room is in a waiting state.

When the state of the target room touched by the player is a room in the waiting state, step 1221 is performed.

Step 1221. The player enters a room when a character selected by the player does not conflict with a character that has been selected in the room.

When the character selected by the player does not conflict with the character that has been selected in the room, the player enters the room.

Step 1222. The player completes selection of the character in the room if user information has been authorized.

When the user information has been authorized, the player completes selection of the character in the room.

Step 1223. The player has not completed selection of the character in the room if the user information is not authorized.

When the user information is not authorized, the player has not completed selection of the character in the room.

Step 1224. The player enters the target room for a plurality of times.

When the player enters the room for the plurality of times, it is determined according to a state of a character currently selected by the player. If the player has completed selection of the character in the room, an interface shown in FIG. 11 will be displayed on the player terminal interface. If the player has completed selection of characters in other rooms, the player cannot enter the room.

Step 1225. The player terminal interface prompts to rescan when a character conflict occurs.

When the character selected by the player conflicts with the character has been selected in the room, the player cannot enter the room, and the player is prompted to reenter the room or rescan the graphic code on the player terminal interface.

Third Case:

Step 1230. The player cannot enter the target room when a state of the target room is an ongoing state.

When the state of the target room touched by the player is a room in the ongoing state, step 1231 is performed.

Step 1231. Reestablish connection when the player has entered the room.

When the player has entered the room, the player terminal reestablishes a connection with the multiplayer somatosensory system combining virtual and reality.

Step 1232. The connection cannot be reestablished when the player does not enter the room.

When the player does not enter the room, the player cannot establish the connection with the multiplayer somatosensory system combining virtual and reality.

Fourth Case:

Step 1240. The player cannot enter the target room when a state of the target room is an ending state.

When the state of the room touched by the player is a room in the ending state, step 1241 is performed.

Step 1241. Reestablish connection when the player has entered the room.

When the player has entered the room, the player terminal reestablishes a connection with the multiplayer somatosensory system combining virtual and reality.

Step 1242. The player terminal displays a score list when a game normally ends.

When a room state is a state that the game normally ends, the player terminal displays a score list interface.

Step 1243. The player terminal does not display the score list when the game is terminated.

When a room state is a state that the game is terminated, the player terminal cannot display the score list interface.

Step 1244. The connection cannot be reestablished when the player does not enter the room.

When the player does not enter the room, the player cannot establish the connection with the multiplayer somatosensory system combining virtual and reality.

Fifth Case:

Step 1250. The player cannot enter the target room when time that the player enters the target room is out.

When the time that the player enters the target room is out, the player cannot enter the room and needs to seek help from an administrator.

In summary, room-related information, virtual character information, player account information, or the like, are transmitted/received to/from the administrator terminal through the computer device, which provides a way for the administrator terminal to quickly join a game under a premise of safety and controllability.

Figure 13:
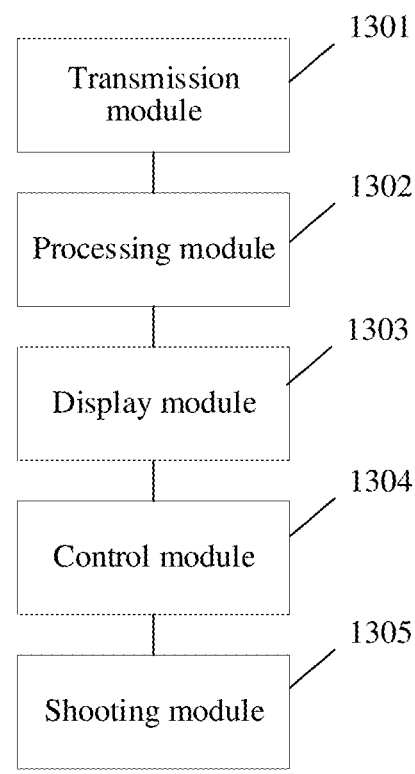
FIG. 13 is a structural block diagram of a multiplayer somatosensory apparatus combining virtual and reality according to an exemplary embodiment of this disclosure.

In an embodiment, FIG. 13 is a structural block diagram of a multiplayer somatosensory apparatus combining virtual and reality according to an exemplary embodiment of this disclosure. The apparatus includes:

a display module 1303, configured to display a virtual environment picture and n aiming points by using the display apparatus, the virtual environment picture being a picture of a virtual environment in which a virtual carrier corresponding to a simulation carrier is located;

a control module 1304, configured to control, in response to a first driving operation on the first peripheral component, the virtual carrier to change a driving direction in the virtual environment;

the control module 1304, further configured to control, in response to a second driving operation on the second peripheral component, the virtual carrier to change the driving speed in the virtual environment; and a shooting module 1305, further configured to shoot a virtual object aimed at an $i^{th}$ aiming point in the virtual environment in the n aiming points in response to a shooting operation on an $i^{th}$ simulation firearm in the n simulation firearms.

In an exemplary embodiment, the simulation carrier includes the simulation vehicle.

In an exemplary embodiment, the control module 1304 is further configured to control, in response to a first driving operation on a steering wheel of the simulation vehicle, the virtual vehicle to change the driving direction in the virtual environment.

In an exemplary embodiment, the simulation carrier includes the simulation aircraft.

In an exemplary embodiment, the control module 1304 is further configured to control, in response to a first driving operation on a flight stick and/or a rudder of the simulation aircraft, a virtual aircraft to change a driving direction in the virtual environment.

In an exemplary embodiment, the control module 1304 is further configured to control, in response to a second driving operation on an accelerator and/or a brake of the simulation vehicle, the virtual vehicle to change the driving speed in the virtual environment.

In an exemplary embodiment, the control module 1304 is further configured to control, in response to a second driving operation on a throttle stick of the simulation aircraft, a virtual aircraft to change a driving speed in the virtual environment.

In an exemplary embodiment, the display apparatus includes n+1 VR headsets.

In an exemplary embodiment, the display module 1303 is further configured to display the virtual environment picture and the ith aiming point in the n aiming points by using an (i+1)th VR headset in the n+1 VR headsets.

In an exemplary embodiment, the display apparatus includes a surround screen or a projector.

In an exemplary embodiment, the display module 1303 is further configured to display the virtual environment picture and the n aiming points by using the surround screen or the projector, the n aiming points having different icon styles, the icon styles including at least one of shape, color, transparency, or number.

In an exemplary embodiment, the multiplayer somatosensory apparatus combining virtual and reality further includes a transmission module 1301 and a processing module 1302.

In an exemplary embodiment, the transmission module 1301 is configured to transmit room information of the virtual environment, an entry graphic code of the driver's seat, and entry graphic codes of the n passenger seats to an administrator terminal.

In an exemplary embodiment, the processing module 1302 is configured to receive a first join request triggered by that a first terminal scans the entry graphic code of the driver's seat. In response to the first join request, the processing module 1302 is further configured to add a virtual character corresponding to a first account logged in by the first terminal to the driver's seat of the virtual carrier in the virtual environment.

In an exemplary embodiment, the processing module 1302 is further configured to receive a second join request triggered by that a second terminal scans the entry graphic code of the passenger seat. In an exemplary embodiment, the processing module 1302 is further configured to, in response to the second join request, add a virtual character corresponding to a second account logged in by the second terminal to the passenger seat of the virtual carrier in the virtual environment.

In summary, a multiplayer somatosensory apparatus combining virtual and reality is constructed, the apparatus controls the display apparatus to display the virtual environment picture and the aiming points, controls the virtual carrier to change the driving direction and driving speed in the virtual environment, and implements shooting the virtual object aimed at the $i^{th}$ aiming point in the virtual environment in the n aiming points, which enriches the human-computer interaction manner of the players in the same somatosensory game, and realizes that different players can play the game by using different operation manners under the same somatosensory game.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing multiplayer somatosensory apparatus combining virtual and display improves a degree of freedom of the game, thereby improving a human-computer interaction experience of the players, and meeting increasing entertainment needs of the players.

Figure 14:
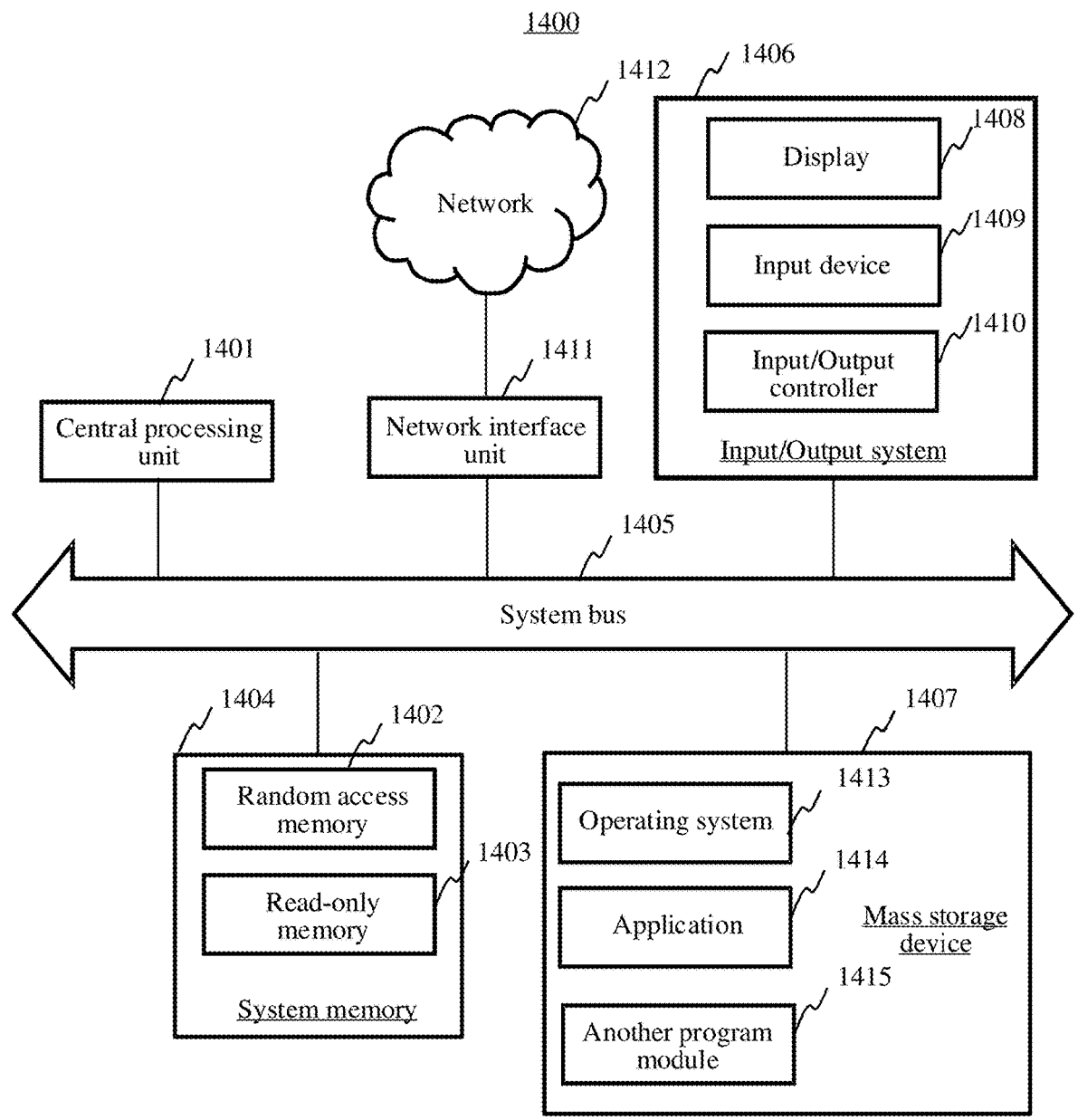
FIG. 14 is a structural block diagram of a computer device according to an exemplary embodiment of this disclosure.

FIG. 14 is a schematic structural diagram of a server according to an embodiment of this disclosure. Specifically, a server 1400 includes a central processing unit (CPU) 1401, a system memory 1404 including a random access memory (RAM) 1402 and a read-only memory (ROM) 1403, and a system bus 1405 connecting the system memory 1404 and the CPU 1401. The computer device 1400 further includes a basic input/output system (I/O system) 1406 configured to transmit information between components in the computer, and a mass storage device 1407 configured to store an operating system 1413, an disclosure 1414, and another program module 1415.

The basic I/O system 1406 includes a display 1408 configured to display information, and an input device 1409 used by a user to input information, such as a mouse or a keyboard. The display 1408 and the input device 1409 are both connected to the CPU 1401 by using an input/output controller 1410 connected to the system bus 1405. The basic input/output system 1406 may further include the input/output controller 1410 configured to receive and process input from multiple other devices such as the keyboard, the mouse, or an electronic stylus. Similarly, the input/output controller 1410 further provides an output to a display screen, a printer or another type of output device.

The mass storage device 1407 is connected to the central processing unit 1401 by using a mass storage controller (not shown) connected to the system bus 1405. The mass storage device 1407 and a non-transitory computer-readable medium associated with the mass storage device 1407 provide non-volatile storage for the server 1400. That is, the mass storage device 1407 may include a computer-readable medium (not shown) such as a hard disk or a compact disc ROM (CD-ROM) drive.

Generally, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in art can know that the computer storage medium is not limited to the foregoing several types. The system memory 1404 and the mass storage device 1407 may be collectively referred to as a memory.

According to various embodiments of this disclosure, the server 1400 may further be connected, by using a network such as the Internet, to a remote computer on the network and run. That is, the server 1400 may be connected to a network 1412 by using a network interface unit 1411 that is connected to the system bus 1405, or may be connected to a network of another type or a remote computer system (not shown) by using the network interface unit 1411.

This disclosure further provides a computer-readable storage medium, the storage medium storing at least one instruction, at least one program, a code set, or an instruction set, and the at least one instruction, the at least one program, the code set, or the instruction set being loaded and executed by the processor to implement the multiplayer somatosensory method combining virtual and reality provided in the foregoing method embodiments.

This disclosure provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the multiplayer somatosensory method combining virtual and reality provided in the foregoing method embodiments.

The sequence numbers of the foregoing embodiments of this disclosure are merely for description purpose, and are not intended to indicate the preference of the embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A multiplayer somatosensory system, comprising:
    a simulation carrier, comprising:
        a driver's seat;
        n passenger seats, disposed adjacent to the driver's seat;
        a first controller, disposed adjacent to the driver's seat and configured to control a driving direction; and
        a second controller, disposed adjacent to the driver's seat and configured to control a driving speed;
    n simulation firearms, n being a positive integer;
    a display apparatus configured to display a virtual environment picture and n aiming points, the virtual environment picture being a picture of a virtual environment in which a virtual carrier corresponding to the simulation carrier is located; and
    a computer, coupled to the simulation carrier, the n simulation firearms, and the display apparatus, and configured to:
        provide the n aiming points;
        control, in response to a first driving operation on the first controller, the virtual carrier to change the driving direction in the virtual environment;
        control, in response to a second driving operation on the second controller, the virtual carrier to change the driving speed in the virtual environment;
        shoot a virtual object aimed at an $i^{th}$ aiming point in the virtual environment in the n aiming points in response to a shooting operation on an $i^{th}$ simulation firearm in the n simulation firearms, i being a positive integer not greater than n;
        transmit room information of the virtual environment, an entry graphic code of the driver's seat, and entry graphic codes of the n passenger seats to an administrator terminal;
        receive a first join request triggered by a first terminal scanning the entry graphic code of the driver's seat; and
        add, in response to the first join request, a virtual character corresponding to a first account logged in by the first terminal to the driver's seat of the virtual carrier in the virtual environment.

2. The system according to claim 1, wherein:
    the simulation carrier comprises a simulation vehicle, the first controller comprises a steering wheel, and the second controller comprises an accelerator and a brake; or,
    the simulation carrier comprises a simulation aircraft, the first controller comprises at least one of a flight stick or a rudder, and the second controller comprises a throttle stick.

3. The system according to claim 1, wherein
    at least one seat of the driver's seat or the n passenger seats comprises a vibration feedback component.

4. The system according to claim 1, wherein
    at least one of the n simulation firearms establishes a wireless communication connection with the computer; and/or,
    at least one of the n simulation firearms establishes a wired communication connection with the computer.

5. The system according to claim 1, wherein
    the display apparatus comprises a virtual reality headset; or
    the display apparatus comprises n+1 virtual reality (VR) headsets; or
    the display apparatus comprises a display screen; or
    the display apparatus comprises a semi-surround screen disposed in front of the simulation carrier or a surround screen disposed on a peripheral side of the simulation carrier; or
    the display apparatus comprises a projector.

6. The system according to claim 5, wherein the display apparatus comprises the semi-surround screen disposed in front of the simulation carrier,
    a width of the semi-surround screen being not less than a width of the simulation carrier, and a height of the semi-surround screen being not less than a height of the simulation carrier.

7. A multiplayer somatosensory method, comprising:
    displaying a virtual environment picture and n aiming points by using a display apparatus, the virtual environment picture being a picture of a virtual environment in which a virtual carrier corresponding to a simulation carrier is located;
    controlling, in response to a first driving operation on a first controller, the virtual carrier to change a driving direction in the virtual environment;
    controlling, in response to a second driving operation on a second controller, the virtual carrier to change a driving speed in the virtual environment;
    shooting a virtual object aimed at an $i^{th}$ aiming point in the virtual environment in n aiming points in response to a shooting operation on an $i^{th}$ simulation firearm in n simulation firearms;
    transmitting room information of the virtual environment, an entry graphic code of a driver's seat, and entry graphic codes of n passenger seats to an administrator terminal;

receiving a first join request triggered by a first terminal scanning the entry graphic code of the driver's seat; and adding, in response to the first join request, a virtual character corresponding to a first account logged in by the first terminal to the driver's seat of the virtual carrier in the virtual environment.

8. The method according to claim 7, wherein the simulation carrier comprises a simulation vehicle; and controlling, in response to the first driving operation on the first controller, the virtual carrier to change the driving direction in the virtual environment comprises:

controlling, in response to the first driving operation on a steering wheel of the simulation vehicle, a virtual vehicle to change the driving direction in the virtual environment.

9. The method according to claim 7, wherein the simulation carrier comprises a simulation aircraft; and controlling, in response to the first driving operation on the first controller, the virtual carrier to change the driving direction in the virtual environment comprises:

controlling, in response to the first driving operation on a flight stick and/or a rudder of the simulation aircraft, a virtual aircraft to change the driving direction in the virtual environment.

10. The method according to claim 7, wherein the simulation carrier comprises a simulation vehicle; and controlling, in response to the second driving operation on the second controller, the virtual carrier to change the driving speed in the virtual environment comprises:

controlling, in response to the second driving operation on an accelerator and/or a brake of the simulation vehicle, a virtual vehicle to change the driving speed in the virtual environment.

11. The method according to claim 7, wherein the simulation carrier comprises a simulation aircraft; and controlling, in response to the second driving operation on the second controller, the virtual carrier to change the driving speed in the virtual environment comprises:

controlling, in response to the second driving operation on a throttle stick of the simulation aircraft, a virtual aircraft to change the driving speed in the virtual environment.

12. The method according to claim 7, wherein the display apparatus comprises n+1 VR headsets; and displaying the virtual environment picture and the n aiming points by using the display apparatus comprises:

displaying the virtual environment picture and the $i^{th}$ aiming point in the n aiming points by using an $(i+1)^{th}$ VR headset in the n+1 VR headsets.

13. The method according to claim 7, wherein the display apparatus comprises a surround screen or a projector; and displaying the virtual environment picture and the n aiming points by using the display apparatus comprises:

displaying the virtual environment picture and the n aiming points by using the surround screen or the projector, the n aiming points having different icon styles, the icon styles comprising at least one of shape, color, transparency, or number.

14. The method according to claim 7, further comprising:

receiving a second join request triggered by that a second terminal scans the entry graphic code of the passenger seat; and adding, in response to the second join request, a virtual character corresponding to a second account logged by the second terminal to the passenger seat of the virtual carrier in the virtual environment.

15. A non-transitory computer-readable storage medium, storing a computer program, the computer program being loaded and executed by a processor to perform steps comprising:

displaying a virtual environment picture and n aiming points by using a display apparatus, the virtual environment picture being a picture of a virtual environment in which a virtual carrier corresponding to a simulation carrier is located;

controlling, in response to a first driving operation on a first controller, the virtual carrier to change a driving direction in the virtual environment;

controlling, in response to a second driving operation on a second controller, the virtual carrier to change a driving speed in the virtual environment; and shooting a virtual object aimed at an $i^{th}$ aiming point in the virtual environment in the n aiming points in response to a shooting operation on an $i^{th}$ simulation firearm in n simulation firearms;

transmitting room information of the virtual environment, an entry graphic code of a driver's seat, and entry graphic codes of n passenger seats to an administrator terminal;

receiving a first join request triggered by a first terminal scanning the entry graphic code of the driver's seat; and adding, in response to the first join request, a virtual character corresponding to a first account logged in by the first terminal to the driver's seat of the virtual carrier in the virtual environment.

16. The non-transitory computer-readable storage medium of claim 15, wherein controlling, in response to the first driving operation on the first controller, the virtual carrier to change the driving direction in the virtual environment comprises:

controlling, in response to the first driving operation on a steering wheel of a simulation vehicle, a virtual vehicle to change the driving direction in the virtual environment.

17. The non-transitory computer-readable storage medium of claim 15, wherein controlling, in response to the first driving operation on the first controller, the virtual carrier to change the driving direction in the virtual environment comprises:

controlling, in response to the first driving operation on a flight stick and/or a rudder of a simulation aircraft, a virtual aircraft to change the driving direction in the virtual environment.

18. The non-transitory computer-readable storage medium of claim 15, wherein controlling, in response to the second driving operation on the second controller, the virtual carrier to change the driving speed in the virtual environment comprises:

controlling, in response to the second driving operation on an accelerator and/or a brake of a simulation vehicle, a virtual vehicle to change the driving speed in the virtual environment.

19. The non-transitory computer-readable storage medium of claim 15, wherein controlling, in response to the second driving operation on the second controller, the virtual carrier to change the driving speed in the virtual environment comprises:

controlling, in response to the second driving operation on a throttle stick of a simulation aircraft, a virtual aircraft to change the driving speed in the virtual environment.

20. The non-transitory computer-readable storage medium of claim 15, wherein displaying the virtual environment picture and the n aiming points by using the display apparatus comprises: displaying the virtual environment picture and the $i^{th}$ aiming point in the n aiming points by using an $(i+1)^{th}$ VR headset in n+1 VR headsets.

* * * * *